US012780138B2

(12) United States Patent
Kawai et al.

(10) Patent No.: US 12,780,138 B2
(45) Date of Patent: Nov. 3, 2026

(54) PASSENGER MONITORING APPARATUS, PASSENGER MONITORING METHOD, AND NON-TRANSITORY COMPUTER-READABLE MEDIUM

(71) Applicant: NEC Corporation, Tokyo (JP)

(72) Inventors: Ryo Kawai, Tokyo (JP); Noboru Yoshida, Tokyo (JP); Jianquan Liu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 231 days.

(21) Appl. No.: 18/709,054

(22) PCT Filed: Nov. 24, 2021

(86) PCT No.: PCT/JP2021/042953
§ 371 (c)(1),
(2) Date: May 10, 2024

(87) PCT Pub. No.: WO2023/095196
PCT Pub. Date: Jun. 1, 2023

(65) Prior Publication Data
US 2025/0001960 A1 Jan. 2, 2025

(51) Int. Cl.
*B60R 21/015* (2006.01)
*G06V 40/10* (2022.01)

(52) U.S. Cl.
CPC ...... *B60R 21/01552* (2014.10); *G06V 40/103* (2022.01)

(58) Field of Classification Search
CPC ....................... B60R 21/01552; G06V 40/103; G06V 20/59; G06V 20/593; G06V 20/597; H04N 7/18
(Continued)

(56) References Cited

U.S. PATENT DOCUMENTS 11,410,516 B2 * 8/2022 Hashimoto ...... G08B 13/19621
12,522,174 B2 * 1/2026 Boyle ..................... B60R 22/48
(Continued)

FOREIGN PATENT DOCUMENTS

JP 2001-285842 A 10/2001
JP 2009-266052 A 11/2009
(Continued)

OTHER PUBLICATIONS

Japanese Office Action for JP Application No. 2023-563373 mailed on Mar. 4, 2025 with English Translation.
(Continued)

*Primary Examiner* — Kathleen Y Dulaney

(57) ABSTRACT

Provided are a passenger monitoring apparatus and so forth capable of monitoring passengers appropriately. A passenger monitoring apparatus includes an image acquiring unit configured to acquire image data capturing an image of a passenger on a means of transportation, a posture identifying unit configured to identify a posture of the passenger based on the acquired image data, a position identifying unit configured to identify a position of the passenger within the means of transportation, and a determining unit configured to determine whether the identified posture of the passenger matches a predetermined posture pattern corresponding to the identified position of the passenger.

20 Claims, 15 Drawing Sheets

(58) Field of Classification Search
USPC .................................... 382/115, 103; 701/45
See application file for complete search history.

(56) References Cited

U.S. PATENT DOCUMENTS

| | | | | |
|---|---|---|---|---|
| 2019/0047578 | A1* | 2/2019 | Swan | G06V 20/597 |
| 2020/0143182 | A1* | 5/2020 | Noh | G06V 10/764 |
| 2021/0107421 | A1* | 4/2021 | Uno | B60R 11/04 |
| 2021/0150754 | A1* | 5/2021 | Tanaka | G06V 40/103 |
| 2021/0155250 | A1* | 5/2021 | Chung | G06V 20/597 |
| 2022/0324354 | A1* | 10/2022 | Kim | B60N 2/1695 |
| 2023/0168364 | A1* | 6/2023 | Podkamien | A61B 5/0205 701/45 |
| 2023/0215192 | A1* | 7/2023 | Kang | G06V 40/18 382/103 |
| 2023/0311759 | A1* | 10/2023 | Abrashov | B60Q 9/008 382/103 |
| 2024/0362931 | A1* | 10/2024 | Katz | G06V 40/20 |

FOREIGN PATENT DOCUMENTS

| | | | |
|---|---|---|---|
| JP | 2013-084088 | A | 5/2013 |
| JP | 2013-084108 | A | 5/2013 |
| JP | 2014-128695 | A | 7/2014 |
| JP | 2016-062414 | A | 4/2016 |
| JP | 2018-144544 | A | 9/2018 |
| JP | 2020-175715 | A | 10/2020 |
| JP | 2021-077390 | A | 5/2021 |
| WO | 2017/056382 | A1 | 4/2017 |
| WO | 2018/105171 | A1 | 6/2018 |

OTHER PUBLICATIONS

Japanese Office Action for JP Application No. 2023-563373 mailed on Dec. 17, 2024 with English Translation.
International Search Report for PCT Application No. PCT/JP2021/042953, mailed on Feb. 8, 2022.

* cited by examiner

PASSENGER MONITORING APPARATUS, PASSENGER MONITORING METHOD, AND NON-TRANSITORY COMPUTER-READABLE MEDIUM

This application is a National Stage Entry of PCT/JP2021/042953 filed on Nov. 24, 2021, the contents of all of which are incorporated herein by reference, in their entirety.

TECHNICAL FIELD

The present disclosure relates to passenger monitoring apparatuses, passenger monitoring methods, and non-transitory computer-readable media.

BACKGROUND ART

Means of transportation such as public buses are widely used, and in recent years, moreover, self-driving of such means of transportation has partly started. A variety of means of transportation including remotely operated vehicles and self-driving vehicles are expected to transport passengers safely regardless of the presence or absence of the driver or an attendant.

For example, Patent Literature 1 discloses a monitoring system that can monitor, for example, the safety of passengers inside a mobile body or passengers entering or exiting a mobile body efficiently with a small number of personnel. Meanwhile, Patent Literature 2 discloses an anomalous activity detecting apparatus that detects an anomalous activity of, for example, a person with the use of a video captured by a camera.

CITATION LIST

Patent Literature

Patent Literature 1: Japanese Unexamined Patent Application Publication No. 2001-285842

Patent Literature 2: Japanese Unexamined Patent Application Publication No. 2009-266052

SUMMARY OF INVENTION

Technical Problem

In order to ensure the safety of passengers on means of transportation, however, a more appropriate way of monitoring the passengers is in demand.

In view of the circumstances above, the present disclosure is directed to providing a passenger monitoring apparatus, a passenger monitoring method, and a non-transitory computer-readable medium capable of monitoring passengers appropriately.

Solution to Problem

A passenger monitoring apparatus according to one aspect of the present disclosure includes:

an image acquiring unit configured to acquire image data capturing an image of a passenger on a means of transportation;

a posture identifying unit configured to identify a posture of the passenger based on the acquired image data;

a position identifying unit configured to identify a position of the passenger within the means of transportation; and a determining unit configured to determine whether the identified posture of the passenger matches a predetermined posture pattern corresponding to the identified position of the passenger.

A passenger monitoring method according to one aspect of the present disclosure includes:

acquiring image data capturing an image of a passenger on a means of transportation;

identifying a posture of the passenger based on the acquired image data;

identifying a position of the passenger within the means of transportation; and determining whether the identified posture of the passenger matches a predetermined posture pattern corresponding to the identified position of the passenger.

A non-transitory computer-readable medium according to one aspect of the present disclosure stores a program that causes a computer to execute an operation including:

a process of acquiring image data capturing an image of a passenger on a means of transportation;

a process of identifying a posture of the passenger based on the acquired image data;

a process of identifying a position of the passenger within the means of transportation; and a process of determining whether the identified posture of the passenger matches a predetermined posture pattern corresponding to the identified position of the passenger.

Advantageous Effects of Invention

The present disclosure can provide a passenger monitoring apparatus, a passenger monitoring method, and a non-transitory computer-readable medium capable of monitoring passengers appropriately.

EXAMPLE EMBODIMENT

Figure 1:
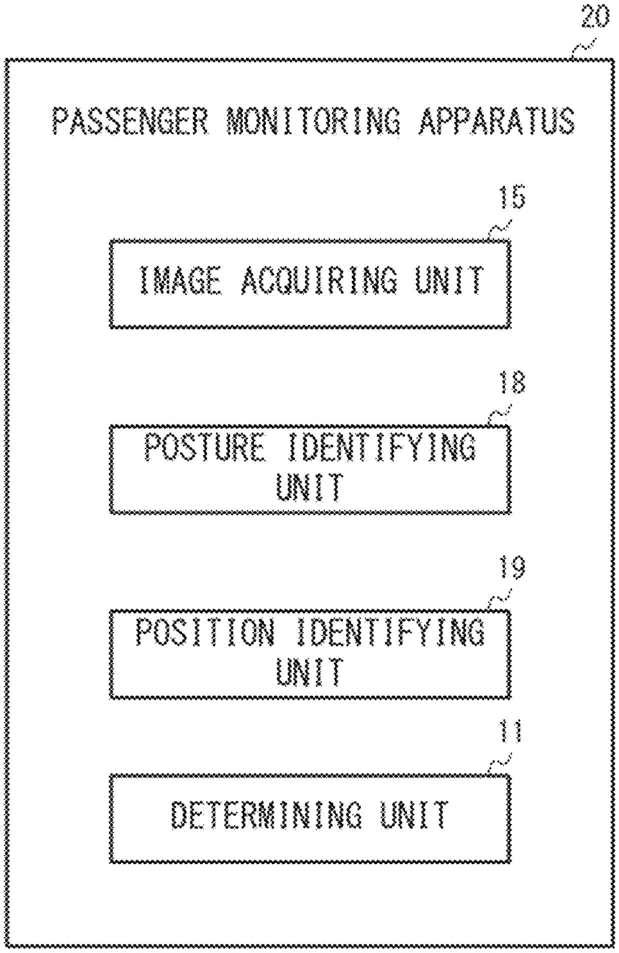
FIG. 1 is a block diagram showing a configuration of a passenger monitoring apparatus according to a first example embodiment.

Hereinafter, the present disclosure will be described through example embodiments, but the following example embodiments do not limit the disclosure set forth in the claims. Not all the configurations described in the example embodiments are essential as means for solving the problem. In the drawings, identical elements are given identical reference characters, and their repetitive description will be omitted as necessary.

First Example Embodiment

First, a first example embodiment of the present disclosure will be described. FIG. 1 is a block diagram showing a configuration of a passenger monitoring apparatus 20 according to the first example embodiment. The passenger monitoring apparatus 20 is a computer that monitors the posture of a passenger on a means of transportation and detects an anomalous state of the passenger while the means of transportation is traveling. The passenger monitoring apparatus 20 may be a terminal apparatus installed in a means of transportation (e.g., bus, train, aircraft, etc.) provided with a monitoring camera or may be a server connected to such a means of transportation via a network. A means of transportation is not limited to a bus or a train and may be any of various suitable means of transportation that transport passengers while monitoring their passengers with a monitoring camera. As shown in FIG. 1, the passenger monitoring apparatus 20 includes an image acquiring unit 15, a posture identifying unit 18, a position identifying unit 19, and a determining unit 11.

The image acquiring unit 15 (which may also be referred to as an image acquiring means) acquires image data capturing an image of a passenger on a means of transportation. The image acquiring unit 15 can acquire captured image data from a camera installed in the means of transportation via a wired or wireless network. A camera 22 includes, for example, an image sensor, such as a complementary metal-oxide semiconductor (CMOS) sensor or a charge-coupled device (CCD) sensor.

The posture identifying unit 18 (which may also be referred to as a posture identifying means) identifies the posture of a passenger based on acquired image data. The posture identifying unit 18 may identify the posture of a passenger through, for example, a known image recognition technique or person detecting technique or may estimate the posture of a passenger through a skeletal structure estimating technique described later.

The position identifying unit 19 identifies the position of a passenger on the means of transportation (e.g., the position where a passenger is located on a bus or in a train car). For example, as the angle of view of a camera is fixed within a means of transportation (e.g., bus), a correspondence relationship between the position of a passenger within a captured image and the position of that passenger within the means of transportation can be defined beforehand, and based on such a definition, a position within an image can be converted to a position within the means of transportation. To be more specific, at a first step, the height at which a camera capturing an image inside a means of transportation, the azimuth and elevation angles of the camera, and the focal length of the camera (referred to below as camera parameters) are estimated from a captured image with the use of an existing technique. These parameters may instead be actually measured or obtained from specifications. At a second step, with the use of an existing technique, the two-dimensional coordinates of the position where the feet of a person are located within an image (referred to below as image coordinates) are converted to the real-world three-dimensional coordinates (referred to below as world coordinates) based on the camera parameters. Herein, although image coordinates are not normally converted uniquely to world coordinates, image coordinates can be converted to world coordinates uniquely when the coordinate value of where the feet are located in the height direction is fixed to, for example, zero. At a third step, with a three-dimensional map of the inside of the means of transportation prepared beforehand, the world coordinates obtained at the second step are projected onto that map, and thus the position of the passenger within the means of transportation can be identified.

The determining unit 11 determines whether an identified posture of a passenger matches a predetermined posture pattern corresponding to the position of that passenger. A predetermined posture pattern may be a normal posture pattern or an anomalous posture pattern corresponding to a given position of a passenger. Positions where a passenger can be located on a means of transportation may include a wide range of areas, including an area with a seat, an area with no seat, and an area off-limits to passengers.

Figure 2:
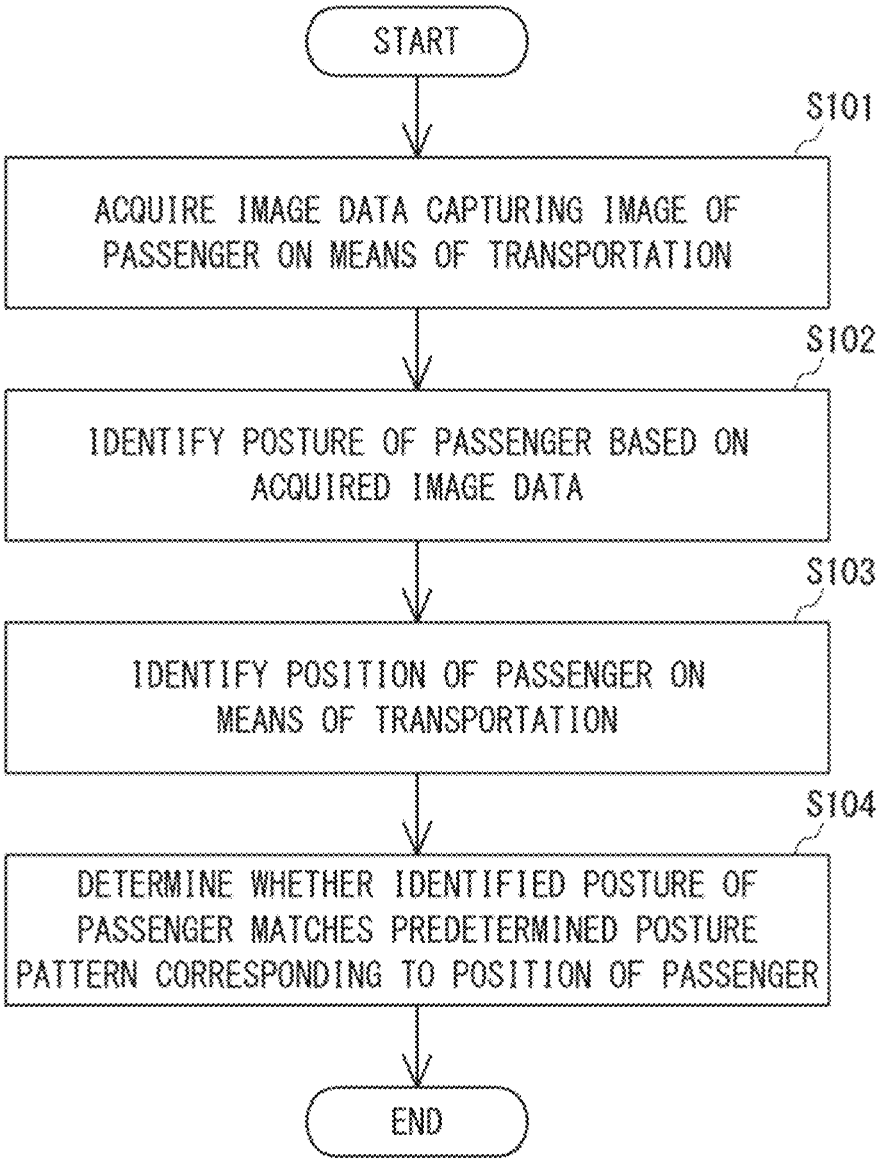
FIG. 2 is a flowchart showing a flow of a passenger monitoring method according to the first example embodiment.

FIG. 2 is a flowchart showing a flow of a passenger monitoring method according to the first example embodiment.

The image acquiring unit 15 acquires image data capturing an image of a passenger on a means of transportation (step S101). The posture identifying unit 18 identifies the posture of the passenger based on the acquired image data (step S102). The position identifying unit 19 identifies the position of the passenger within the means of transportation (step S103). The determining unit 11 determines whether the identified posture of the passenger matches a predetermined posture pattern corresponding to the position of the passenger (step S104).

In this manner, according to the first example embodiment, the passenger monitoring apparatus 20 can make a determination of a normal posture pattern or an anomalous posture pattern according to the position of a passenger within a means of transportation. This configuration makes it possible to monitor passengers appropriately and to achieve safe traveling of a means of transportation.

Second Example Embodiment

Figure 3:
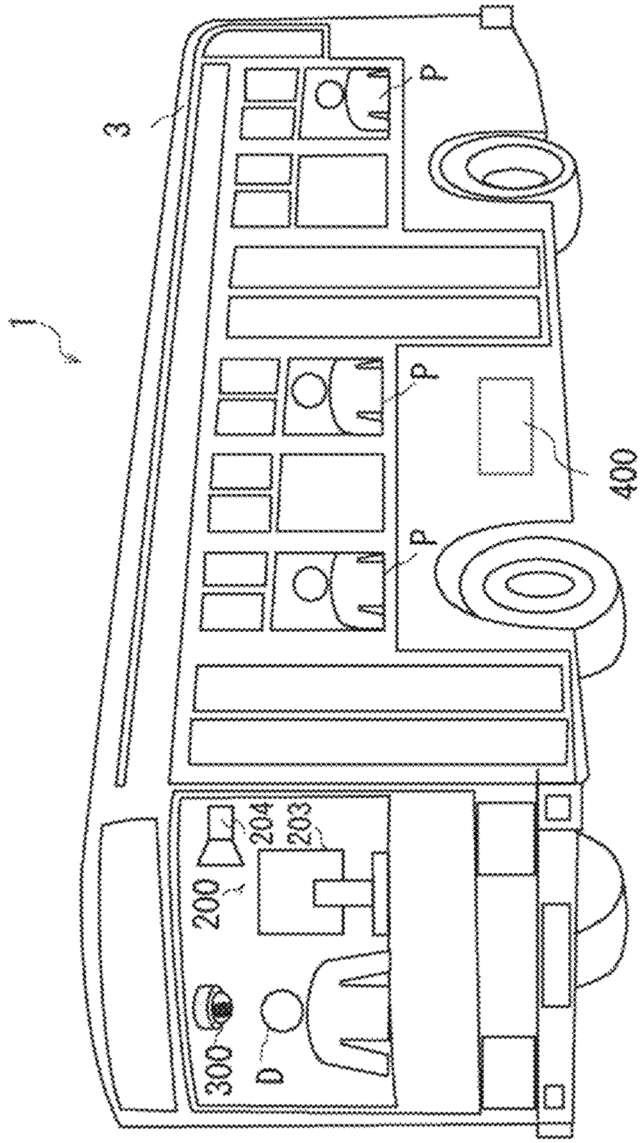
FIG. 3 shows an overall configuration of a passenger monitoring system according to a second example embodiment.

Next, a second example embodiment of the present disclosure will be described. FIG. 3 shows an overall configuration of a passenger monitoring system 1 according to the second example embodiment. The passenger monitoring system 1 is a computer system that monitors one or more passengers P on a bus and, in response to detecting an anomalous state, executes a predetermined process.

As one example, a normal flow observed when a passenger P gets on a bus 3 and sits or stands at a predetermined position is as follows.

(1) First, a passenger P gets on the bus 3 and sits or stands at a desired position (e.g., on a seat, at a place to stand). (2) The bus starts traveling. (3) In accordance with the position of the passenger on the bus, the posture or the movement of the passenger P on the traveling bus is monitored with a camera. (4) Upon the bus arriving at a destination, the passenger P gets off. The operation in (1) to (3) is repeated for all the passengers.

In this example, the passenger monitoring system 1 includes a terminal apparatus 200 and one or more cameras 300 installed in the bus 3. The terminal apparatus 200 and the camera or cameras 300 are communicably connected via a network N. The network N may be a wired network or a wireless network.

A camera 300 is disposed at any of a variety of places on the bus 3 and captures, for monitoring, an image of, for example, a passenger standing near a hanging strap or a grab bar or a passenger sitting on a seat. The variety of places on the bus may include, for example, the ceiling or an inner side wall of the bus and a place where the camera can capture an image of the inside of the bus from the outer front or the outer back of the bus. Each camera 300 is disposed at a position and an angle at which the camera 300 can capture an image of at least a part of a passenger's body. The cameras 300 may include one or more stationary cameras or one or more 360-degree cameras (omnidirectional cameras). In some example embodiments, a camera 300 may be a camera for imaging a skeletal structure.

The terminal apparatus 200 (which may also be referred to as a passenger monitoring apparatus) acquires video data from a camera 300, detects an anomalous posture or an anomalous movement of a passenger, and outputs warning information via a display unit 203 or an audio output unit 204. The display unit 203 or the audio output unit 204 may also be referred to collectively as an informing unit for informing a user. The display unit 203 of the terminal apparatus 200 can be installed at a position that allows for easy viewing by, for example, a driver D of the bus, an attendant (not shown), or one or more passengers. In some example embodiments, a display unit 203 may be provided separately for the driver D of the bus, an attendant (not shown), or a passenger. The audio output unit 204 of the terminal apparatus 200 can be installed at a position that allows for easy hearing of the audio by the driver D of the bus, an attendant (not shown), or a passenger. An audio output unit 204 may be provided separately for the driver D of the bus, an attendant (not shown), or a passenger. In another example embodiment, the terminal apparatus 200 may be or may include a wearable device or a mobile terminal worn by the driver D of the bus or by an attendant (not shown).

Figure 4:
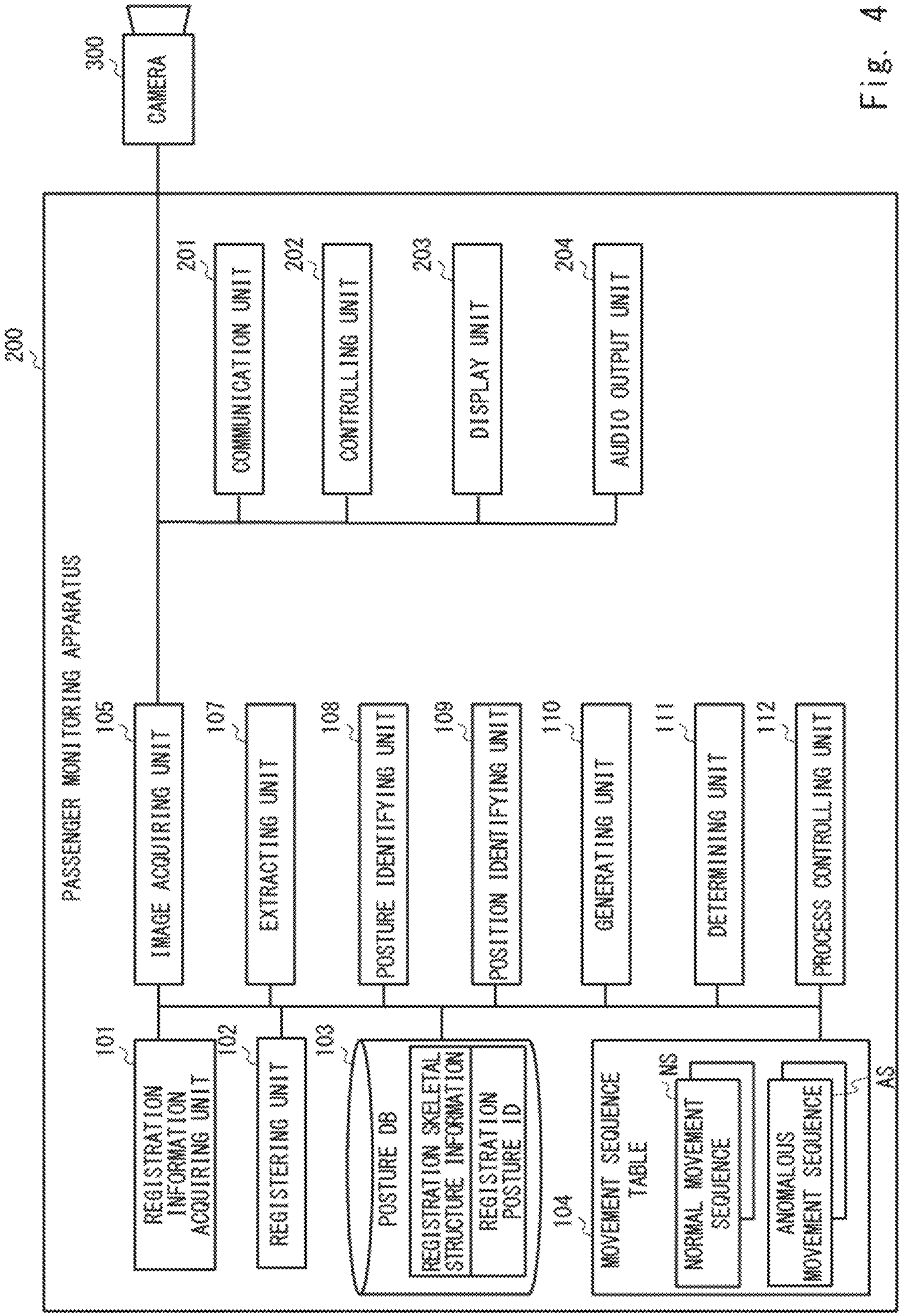
FIG. 4 is a block diagram showing a configuration of a server and a terminal apparatus according to the second example embodiment.

FIG. 4 is a block diagram showing a configuration of a terminal apparatus 200 according to the second example embodiment.

The terminal apparatus 200 includes a communication unit 201, a controlling unit 202, a display unit 203, and an audio output unit 204. The terminal apparatus 200 is realized by a computer.

The communication unit 201 is also referred to as a communication means. The communication unit 201 is a communication interface with a network N. The communication unit 201 is connected to a camera 300 and acquires video data from the camera 300 at predetermined intervals.

The controlling unit 202 is also referred to as a controlling means. The controlling unit 202 controls hardware of the terminal apparatus 200. For example, the controlling unit 202, in response to detecting a start trigger, starts monitoring and analyzing video data acquired from the camera 300. Detection of a start trigger indicates, for example, that "a bus has started traveling" as mentioned above. Meanwhile, the controlling unit 202, in response to detecting an end trigger, stops monitoring and analyzing video data acquired from the camera 300. Detection of an end trigger indicates, for example, that "the bus has stopped" or "all the passengers are determined to have gotten off the bus" as mentioned above.

In some example embodiments, the controlling unit 202 may control self-driving or drive assistance of a bus through a drive controlling unit 400 of a bus 3. The drive controlling unit 400 may be an electronic control unit (ECU) of a bus and is constituted by a computer. In some example embodiments, the drive controlling unit 400 can implement self-driving or drive assistance via various sensors (e.g., camera, LiDAR) provided, for example, on the outside of the vehicle.

The display unit 203 is a display apparatus. The audio output unit 204 is an audio output apparatus including a speaker.

The terminal apparatus 200 further includes a registration information acquiring unit 101, a registering unit 102, a posture DB 103, a movement sequence table 104, an image acquiring unit 105, an extracting unit 107, a posture identifying unit 108, a position identifying unit 109, a generating unit 110, a determining unit 111, and a process controlling unit 112 (e.g., an output unit and a drive controlling unit described later). These constituent elements may be used primarily to monitor a passenger P and to execute a predetermined process in response to detecting an anomalous state.

The registration information acquiring unit 101 is also referred to as a registration information acquiring means. The registration information acquiring unit 101 acquires a plurality of pieces of video data for registration in response to a posture registration request from the user interface of the terminal apparatus 200. In the present second example embodiment, each of the pieces of video data for registration is video data showing an individual posture included in a normal state or an anomalous state of a passenger defined in accordance with a position within a bus. For example, for a place to stand within a bus, each of the pieces of video data for registration is video data showing an individual posture included in a normal state (e.g., a passenger is standing while holding a hanging strap) or an anomalous state (e.g., a passenger is crouching down) of a passenger. Meanwhile, for a place to sit within a bus, each of the pieces of video data for registration is video data showing an individual posture included in a normal state (e.g., a passenger is sitting on a seat) or an anomalous state (e.g., a passenger is sticking his or her face out a window or standing on a seat) of a passenger. In the present second example embodiment, video data for registration is typically a still image (one frame image), but may instead be a moving image that includes a plurality of frame images. The registration information acquiring unit 101 supplies these pieces of acquired information to the registering unit 102.

The registering unit 102 is also referred to as a registering means. First, the registering unit 102 executes a posture registering process in response to a registration request from a user. Specifically, the registering unit 102 supplies video data for registration to the extracting unit 107 described later and acquires skeletal structure information extracted from the video data for registration from the extracting unit 107 as registration skeletal structure information. Then, the registering unit 102 registers the acquired registration skeletal structure information into the posture DB 103 with the registration skeletal structure information linked to a registration posture ID and a position or an area within a bus. Examples of areas within a bus include an area with a seat, an area with no seat, and an area near an entrance/exit. The registration skeletal structure information is associated with these various positions and areas within a bus.

Next, the registering unit 102 executes a sequence registering process in response to a sequence registration request. Specifically, the registering unit 102 arranges registration movement IDs in chronological order based on information indicating the chronological order and thus generates a registration movement sequence. At this point, if the sequence registration request concerns a normal posture or a normal movement, the registering unit 102 registers the generated registration movement sequence into the movement sequence table 104 as a normal movement sequence NS. Meanwhile, if the sequence registration request concerns an anomalous movement, the registering unit 102 registers the generated registration movement sequence into the movement sequence table 104 as an anomalous movement sequence AS.

The posture DB 103 is a storage device that stores registration skeletal structure information corresponding to each of a posture or a movement included in a normal state of a passenger with the registration skeletal structure information linked to position information within a bus and a registration posture ID. Furthermore, the posture DB 103 may store position information within a bus and registration skeletal structure information corresponding to each of a posture or a movement included in an anomalous state with these pieces of information linked to a registration posture ID. Position information within a bus may include, for example, an area with a seat, an area with no seat, and an area that passengers do not enter (e.g., luggage compartment).

The movement sequence table 104 stores a normal movement sequence NS and an anomalous movement sequence AS. According to the present second example embodiment, the movement sequence table 104 stores a plurality of normal movement sequences NS and a plurality of anomalous movement sequences AS.

The image acquiring unit 105 is also referred to as an image acquiring means and is one example of the image acquiring unit 15 described above. The image acquiring unit 105 acquires video data captured by the camera 300. In other words, the image acquiring unit 105 acquires video data in response to a start trigger being detected. The image acquiring unit 105 supplies a frame image included in the acquired video data to the extracting unit 107.

The extracting unit 107 is also referred to as an extracting means. The extracting unit 107 detects an image region of a body (body region) of a person from a frame image included in video data and extracts (e.g., cuts out) the detected image region as a body image. Then, with the use of a skeletal structure estimating technique using machine learning, the extracting unit 107 extracts skeletal structure information of at least a part of the body of the person based on features of, for example, joints of the person recognized in the body image. Skeletal structure information is information composed of a "key point," which is a characteristic point such as a joint, and a "bone (bone link)" indicating a link between key points. The extracting unit 107 may use, for example, a skeletal structure estimating technique, such as OpenPose. The extracting unit 107 supplies the extracted skeletal structure information to the posture identifying unit 108.

The posture identifying unit 108 is also referred to as a posture identifying means and is one example of the posture identifying unit 18 described above. The posture identifying unit 108 converts skeletal structure information extracted from video data acquired during operation to a posture ID with the use of the posture DB 103. Thus, the posture identifying unit 108 identifies the posture of a passenger. Specifically, first, the posture identifying unit 108 identifies, from the registration skeletal structure information registered in the posture DB 103, registration skeletal structure information having a degree of similarity with the skeletal structure information extracted by the extracting unit 107 higher than or equal to a predetermined threshold. Then, the posture identifying unit 108 identifies the registration posture ID linked to the identified registration skeletal structure information as the posture ID corresponding to the person included in the acquired frame image.

The position identifying unit 109 is also referred to as a position identifying means and is one example of the position identifying unit 19 described above. The position identifying unit 109 identifies the position of a passenger within a bus from acquired image data. For example, as the angle of view of a camera is fixed within a bus, a correspondence relationship between the position of a passenger in a captured image and the position of that passenger within the bus can be defined beforehand. Based on such a definition, a position within an image can be converted to a position within a means of transportation. To be more specific, at a first step, the height at which a camera capturing an image, the azimuth and elevation angles of the camera, and the focal length of the camera (referred to below as camera parameters) are estimated from a captured image with the use of an existing technique. These parameters may instead be actually measured or obtained from specifications. At a second step, with the use of an existing technique, the two-dimensional coordinates of the position where the feet of a person are located within an image (referred to below as image coordinates) are converted to the real-world three-dimensional coordinates (referred to below as world coordinates) based on the camera parameters. Herein, although image coordinates are not normally converted uniquely to world coordinates, image coordinates can be converted to world coordinates uniquely when the coordinate value of where the feet are located in the height direction is fixed to, for example, zero. At a third step, with a three-dimensional map of the inside of the bus prepared beforehand, the world coordinates obtained at the second step are projected onto that map, and thus the position of the passenger within the bus can be identified. The position of a passenger within a bus can be roughly, for example, in an area with a seat, in an area with no seat, or in an area that passengers do not enter (e.g., luggage compartment). In another example embodiment, a specific position of a passenger within a bus may be in a seating place with a specified seat number or in a place for standing near a seating place with a specified seat number.

The generating unit 110 is also referred to as a generating means. The generating unit 110 generates a movement sequence based on a plurality of posture IDs identified by the posture identifying unit 108. The movement sequence is composed so as to include a plurality of movement IDs in chronological order. The generating unit 110 supplies the generated movement sequence to the determining unit 111.

The determining unit 111 is also referred to as a determining means and is one example of the determining unit 11 described above. The determining unit 111 determines whether a generated movement sequence matches (corresponds to) any of the normal postures or the normal movement sequences NS registered in the movement sequence table 104.

The process controlling unit 112 outputs warning information to the terminal apparatus 200 if a generated movement sequence is determined not to match any of the normal movement sequences NS. Specifically, one implementation of the process controlling unit 112 may be an output unit configured to output a warning to, for example, the driver, an attendant, or a passenger on the bus via a constituent element (e.g., the display unit 203, the audio output unit 204) of the terminal apparatus 200. The output unit can output a different warning depending on the type or the content of a determined anomalous state. For example, when a determination of an anomalous posture state is made in which a passenger in a seating place is leaning out of a window near the seat, a warning audio stating "Please do not lean out of the window because it is dangerous" can be output from the audio output unit 204 inside the bus 3. Alternatively, when a determination of an anomalous posture state is made in which a passenger in a seating place is leaning out of a window near the seat, the driver may be informed via the display unit 203 inside the bus 3 and may, using a microphone, give the passenger a warning stating "Please do not lean out of the window because it is dangerous." In another example, when a passenger at a position with no seat is feeling sick and crouching down, an attendant, not the driver, may be informed of such an anomalous state via the display unit 203 or the audio output unit 204. In this case, while the driver continues to drive, the attendant can get to the passenger and help that passenger. Alternatively, in the case above, a warning stating "Please yield your seat to the passenger who is feeling sick" may be output to the other passengers via the audio output unit 204.

In another example embodiment, the process controlling unit 112 can execute a process for the drive controlling unit 400 that controls self-driving or drive assistance of a bus. For example, if it is determined that many of a plurality of passengers standing in an area with no seat have all fallen onto the floor, the process controlling unit 112 can perform control of causing the drive controlling unit 400 to decelerate or stop the bus. The above are merely examples of some processes that can be performed by the process controlling unit, and various modifications and corrections can be made.

If the determining unit 111 has determined that the movement sequence above fails to match any of the normal postures or the normal movement sequences NS, the determining unit 111 may determine whether the movement sequence above matches an anomalous posture or an anomalous movement sequence AS. In this case, the process controlling unit 112 may output, to the terminal apparatus 200, warning information set beforehand in accordance with the type of the anomalous posture or of the anomalous movement sequence. As an example, the display mode (the letter font, color, or thickness, blinking, etc.) adopted to display warning information may be varied in accordance with the type of an anomalous movement sequence, or the volume or the voice itself adopted to audibly output warning information may be varied in accordance with the type of an anomalous movement sequence. Furthermore, the content of the warning to be output may be varied in accordance with the type of an anomalous movement sequence. Thus, the driver, an attendant, or other passengers, for example, can recognize the content of an anomalous state of a passenger, and promptly and appropriately respond to the anomalous state. Furthermore, the process controlling unit 112 may record, as history information, the time and place at which an anomalous state of a passenger has occurred and the video captured when that anomalous state has occurred along with the information about the type of the anomalous posture or the anomalous movement sequence. Thus, the driver, an attendant, other passengers, or an external help staff member, for example, can recognize the content of the anomalous state and take an appropriate measure against the anomalous state.

Figure 5:
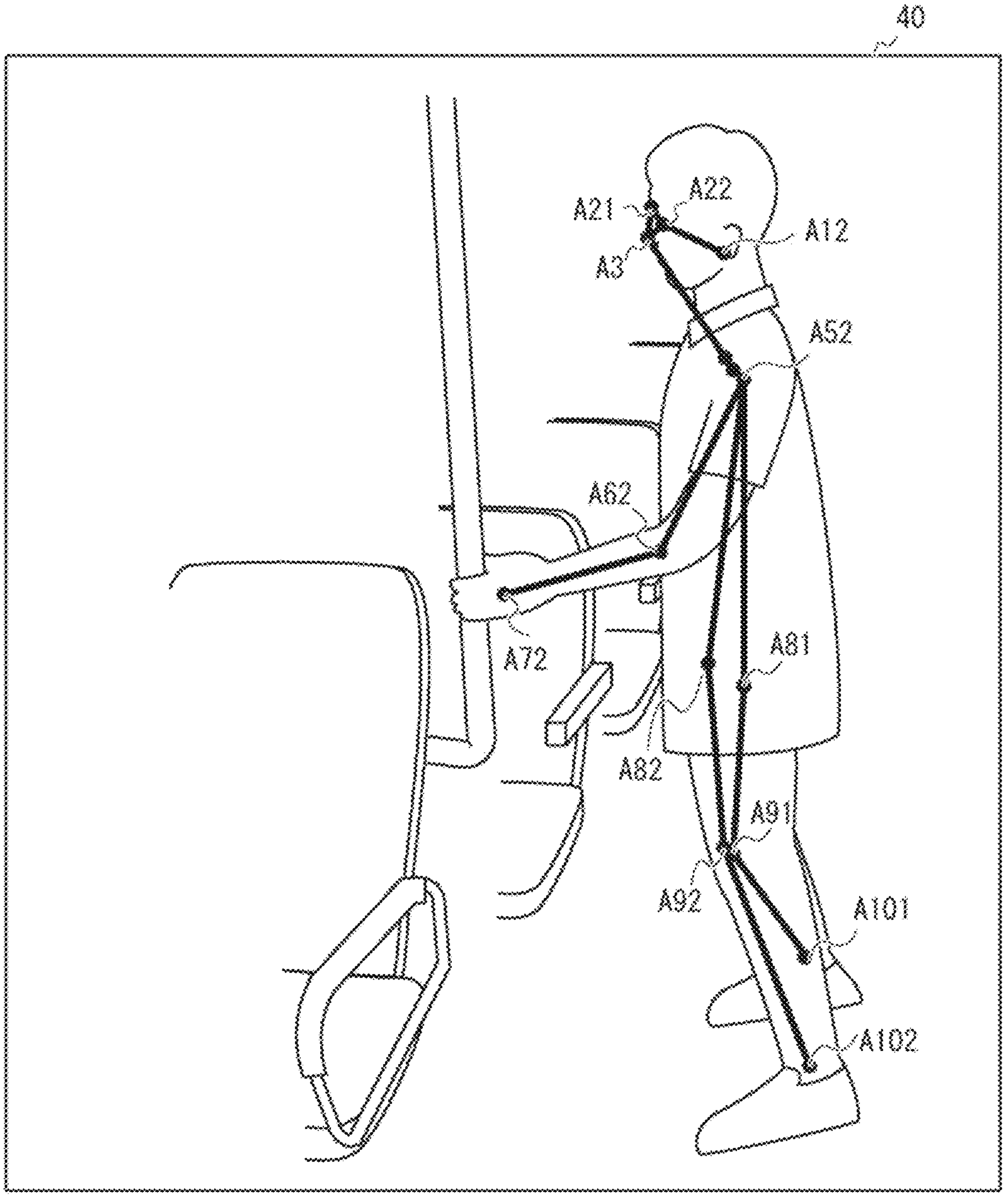
FIG. 5 shows skeletal structure information of a standing passenger extracted from a frame image included in video data according to the second example embodiment.

FIG. 5 shows skeletal structure information of a standing passenger extracted from a frame image 40 included in video data according to the second example embodiment. The frame image 40 includes an image captured, from the side, of the posture of a passenger standing with his or her hand on a grab bar. The skeletal structure information shown in FIG. 5 also includes a plurality of key points and a plurality of bones detected from the entire body. For example, FIG. 5 shows, as key points, a left ear A12, a right eye A21, a left eye A22, a nose A3, a left shoulder A52, a left elbow A62, a left hand A72, a right hip 81, a left hip 82, a right knee 91, a left knee 92, a right ankle 101, and a left ankle 102.

Figure 7:
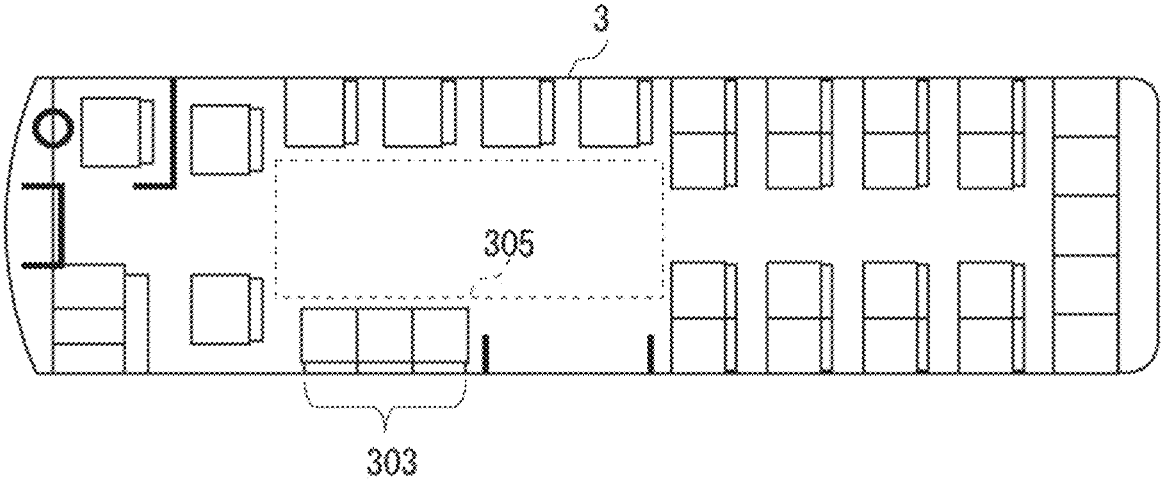
FIG. 7 shows a seating chart of a bus according to the second example embodiment.

The terminal apparatus 200 compares such skeletal structure information and registration skeletal structure information corresponding to an area with no seat (e.g., registration skeletal structure information of a standing passenger) and determines whether these pieces information are similar, and thus the terminal apparatus 200 identifies the posture. An area with no seat may correspond, for example, to a center area 305 in the diagram showing a seating chart of a bus shown in FIG. 7. For example, since the position of the hips (the right hip 81 and the left hip 82) of the passenger shown in FIG. 5 are in the center area 305 of FIG. 7, the passenger may be identified as being situated in an area with no seat. In this case, registration skeletal structure information corresponding to an area with no seat may be used. In the present example, the skeletal structure information of the passenger in the frame image 40 may be determined to indicate a normal posture.

Figure 6:
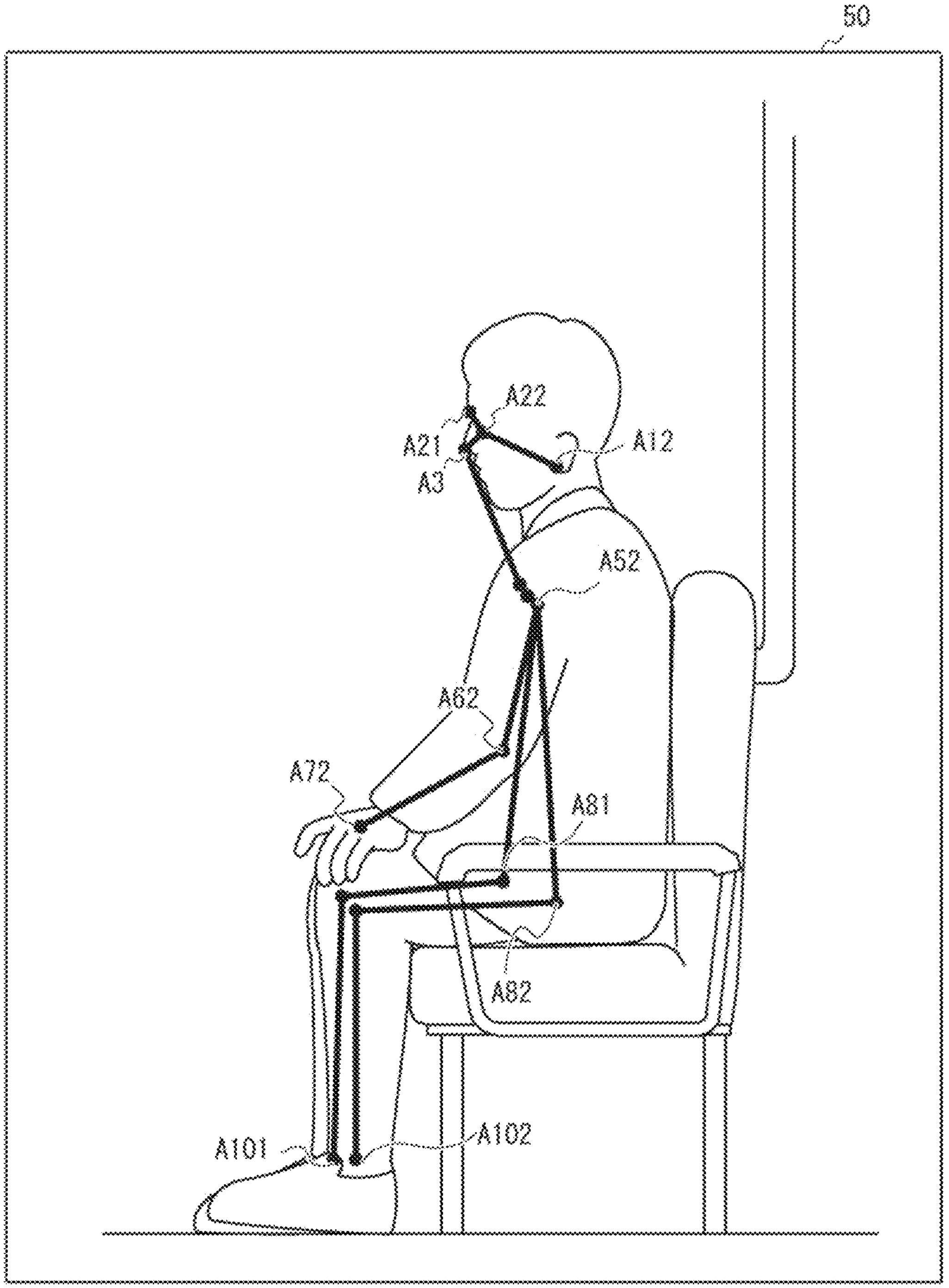
FIG. 6 shows skeletal structure information of a sitting passenger extracted from a frame image included in video data according to the second example embodiment.

FIG. 6 shows skeletal structure information of a sitting passenger extracted from a frame image 50 according to the second example embodiment. The frame image 50 includes an image captured, from the side, of the posture of a passenger sitting on a seat. The skeletal structure information shown in FIG. 6 also includes a plurality of key points and a plurality of bones detected from the entire body. For example, FIG. 6 shows, as key points, a left ear A12, a right eye A21, a left eye A22, a nose A3, a left shoulder A52, a left elbow A62, a left hand A72, a right hip 81, a left hip 82, a right knee 91, a left knee 92, a right ankle 101, and a left ankle 102.

The terminal apparatus 200 compares such skeletal structure information and registration skeletal structure information corresponding to an area with a seat (e.g., registration skeletal structure information of a sitting passenger) and determines whether these pieces information are similar, and thus the terminal apparatus 200 identifies the posture. An area with no seat may correspond, for example, to an area with a seat in the diagram showing the seating chart of the bus shown in FIG. 7. For example, since the position of the hips (the right hip 81 and the left hip 82) of the passenger shown in FIG. 6 are on one of the seats shown in FIG. 7, the passenger may be identified as being situated in an area with a seat. In this case, registration skeletal structure information corresponding to an area with a seat may be used. In the present example, the skeletal structure information of the passenger in the frame image 50 may be determined to indicate a normal posture.

In another example embodiment, skeletal structure information of a passenger in an area 303 with a priority seat may be compared against registration skeletal structure information corresponding to a priority seat (e.g., skeletal structure information of a passenger with a disabled leg, skeletal structure information of a pregnant woman, etc.). Specifically, when a passenger not matching skeletal structure information of a passenger with a disabled leg or skeletal structure information of a pregnant woman is sitting on a priority seat, a warning stating "Please yield your seat to a pregnant woman" may be output via the audio output unit 204. In yet another example, a warning stating, for example, "Please yield your seat to a pregnant woman or a person with a physical disability" may be output only when "there is no registration skeletal structure information corresponding to a priority seat in an area with a priority seat" or "there is registration skeletal structure information corresponding to a priority seat around an area with a priority seat (or in the entire area with no seat).

In another example embodiment, there may be a case in which it is not desirable if a passenger stays standing near an entrance/exit or in a passageway since such a passenger prevents another passenger from passing through. In this case, registration skeletal structure information corresponding to such areas—both registration skeletal structure information of a standing passenger and registration skeletal structure information of a sitting passenger—may be registered as an anomalous posture state.

Figure 8:
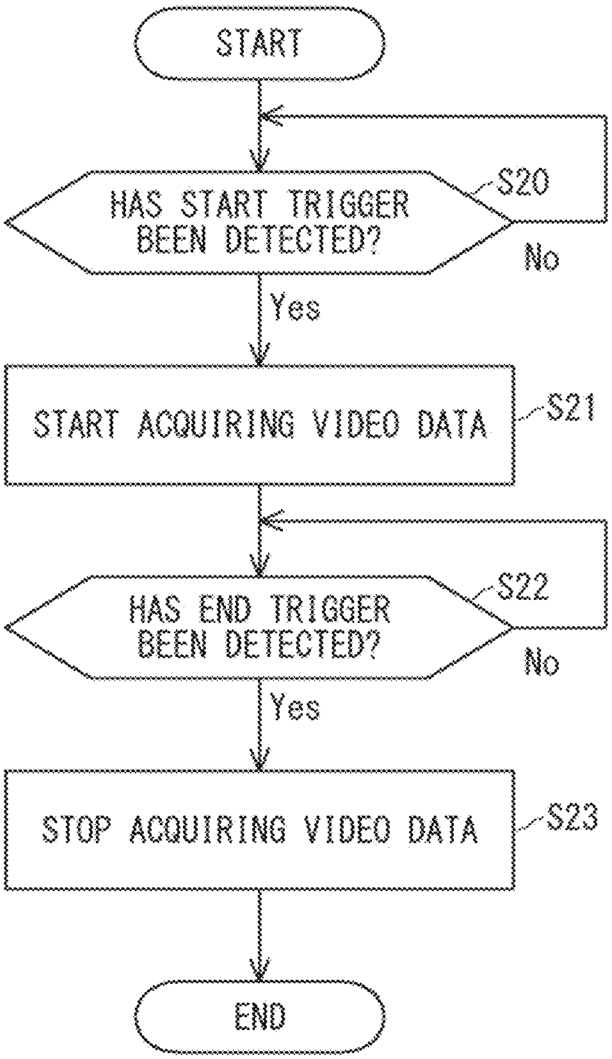
FIG. 8 is a flowchart showing a method of acquiring video data by a terminal apparatus according to the second example embodiment.

FIG. 8 is a flowchart showing a flow of a method of acquiring video data by a terminal apparatus 200 according to the second example embodiment. First, the controlling unit 202 of the terminal apparatus 200 determines whether the controlling unit 202 has detected a start trigger (S20). If the controlling unit 202 determines that the controlling unit 202 has detected a start trigger (Yes at S20), the controlling unit 202 starts acquiring video data from a camera 300 (S21). Meanwhile, if the controlling unit 202 does not determine that the controlling unit 202 has detected a start trigger (No at S20), the controlling unit 202 repeats the process indicated at S20.

Next, the controlling unit 202 of the terminal apparatus 200 determines whether the controlling unit 202 has detected an end trigger (S22). If the controlling unit 202 determines that the controlling unit 202 has detected an end trigger (Yes at S22), the controlling unit 202 stops acquiring video data from the camera 300 (S23). Meanwhile, if the controlling unit 202 does not determine that the controlling unit 202 has detected an end trigger (No at S22), the controlling unit 202 repeats the process indicated at S22 while continuing to acquire video data.

In this manner, as the period in which video data is acquired is limited to the period from a predetermined start trigger to a predetermined end trigger, the amount of communication data can be limited to the minimum. Furthermore, the process of detecting a posture and a movement by the terminal apparatus 200 can be omitted outside the period mentioned above, and thus the calculation resources can be saved.

In another example embodiment, the process of detecting a posture and a movement may be executed continuously from the starting time to the ending time of the service of a bus. In other words, even during a period in which a bus is stationary temporarily at a bus stop, video data of a passenger may be acquired, and the posture or the movement of the passenger may be detected and determined.

Figure 9:
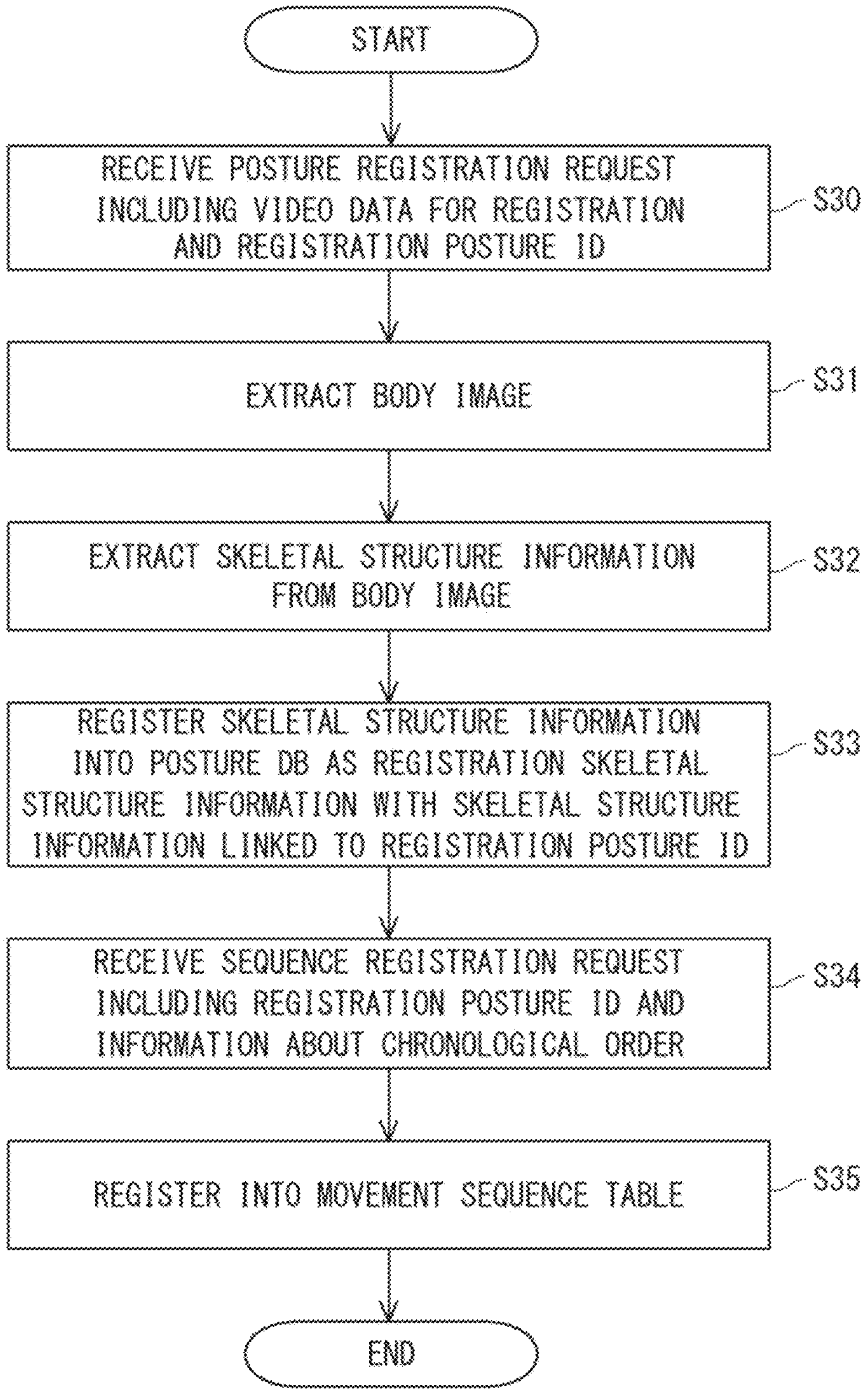
FIG. 9 is a flowchart showing a flow of a method of registering a registration posture ID and a registration movement sequence by a server according to the second example embodiment.

FIG. 9 is a flowchart showing a flow of a method of registering a registration posture ID and a registration movement sequence by a terminal apparatus 200 according to the second example embodiment. First, the registration information acquiring unit 101 of the terminal apparatus 200 receives, from the user interface of the terminal apparatus 200, a movement registration request including video data for registration and a registration posture ID (S30). Next, the registering unit 102 supplies the video data for registration to the extracting unit 107. Having acquired the video data for registration, the extracting unit 107 extracts a body image from a frame image included in the video data for registration (S31). Next, the extracting unit 107 extracts skeletal structure information from the body image (S32). Next, the registering unit 102 acquires the skeletal structure information from the extracting unit 107 and registers the acquired skeletal structure information into the posture DB 103 as registration skeletal structure information with the skeletal structure information linked to the registration posture ID (S33). Herein, the registering unit 102 may register the entire skeletal structure information extracted from the body image as the registration skeletal structure information or may register only part of the skeletal structure information (e.g., skeletal structure information of hips, shoulders, elbows, and hands) as the registration skeletal structure information.

Figure 10:
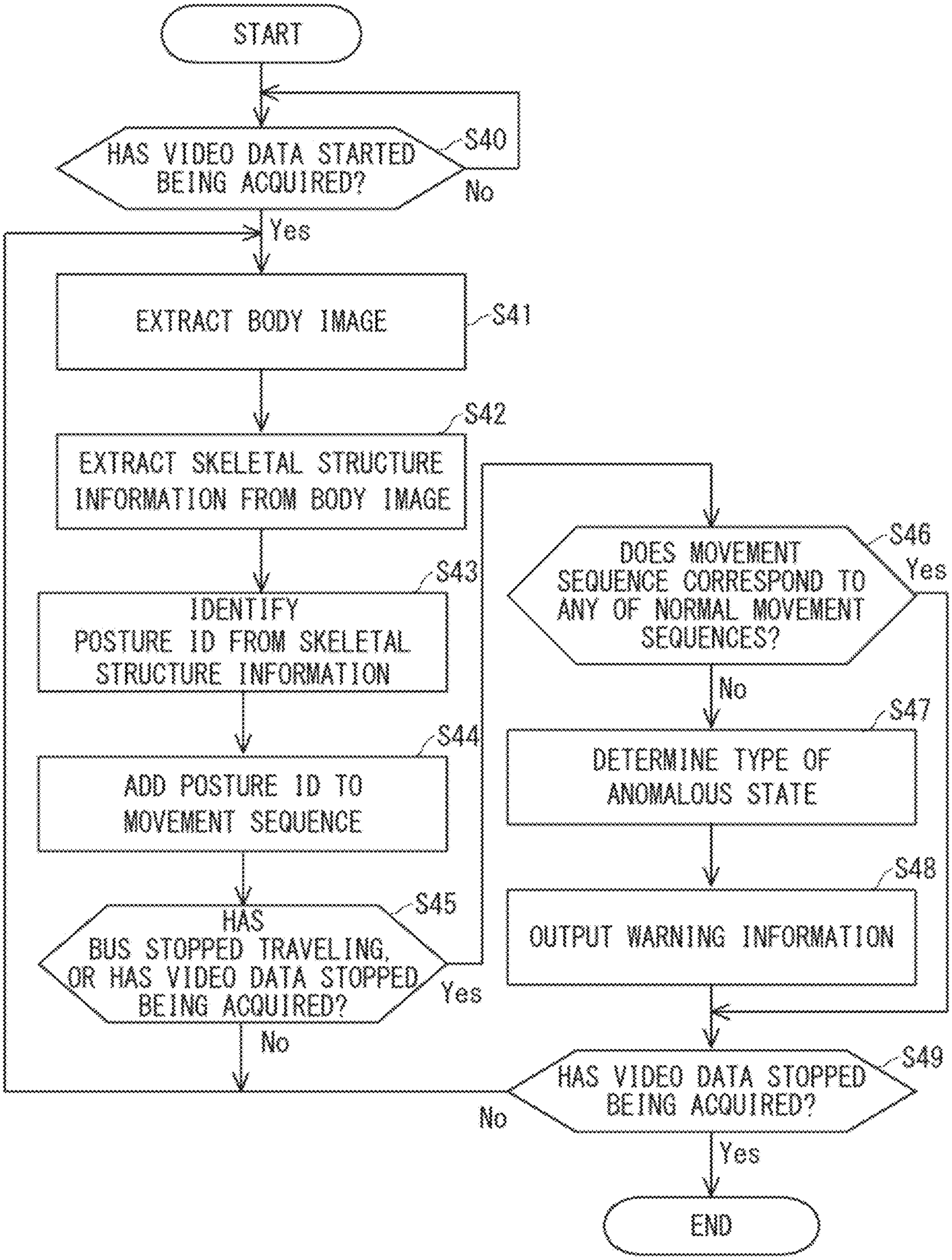
FIG. 10 is a flowchart showing a flow of a method of detecting a posture and a movement by a server according to the second example embodiment.

FIG. 10 is a flowchart showing a flow of a method of detecting a posture by a terminal apparatus 200 according to the second example embodiment. First, if the image acquiring unit 105 of the terminal apparatus 200 has started acquiring video data from a camera 300 (Yes at S40), the extracting unit 107 extracts a body image from a frame image included in the video data (S41). Next, the extracting unit 107 extracts skeletal structure information from the body image (S42). The posture identifying unit 108 calculates the degree of similarity between at least part of the extracted skeletal structure information and each piece of the registration skeletal structure information registered in the posture DB 103 and identifies, as a posture ID, the registration posture ID linked to the piece of registration skeletal structure information having a degree of similarity higher than or equal to a predetermined threshold (S43). Next, the generating unit 110 adds the posture ID to a movement sequence. Specifically, the generating unit 110 sets the posture ID identified at S43 as a movement sequence in the initial cycle, or adds the posture ID identified at S43 to an already generated movement sequence in cycles subsequent to the initial cycle. Then, the terminal apparatus 200 determines whether the bus has stopped traveling or determines whether the acquisition of video data has ended (S45). If the terminal apparatus 200 determines that the bus has stopped traveling or determines that the acquisition of video data has ended (Yes at S45), the process proceeds to S46. Meanwhile, if neither determination is true (No at S45), the process returns to S41, and the terminal apparatus 200 repeats the process of adding to the movement sequence.

At S46, the determining unit 111 determines whether the movement sequence matches any of the normal postures or the normal movement sequences NS in the movement sequence table 104. If the movement sequence matches a normal posture or a normal movement sequence NS (Yes at S46), the process proceeds to S49. Meanwhile, if the movement sequence does not match any normal posture or normal movement sequence NS (No at S46), the process proceeds to S47.

At S47, the determining unit 111 determines whether the movement sequence matches any of the anomalous movement sequences AS in the movement sequence table 104 and thus determines the type of the anomalous movement. Then, the process controlling unit 112 outputs warning information corresponding to the type of the anomalous movement to the terminal apparatus 200 (S48). The terminal apparatus 200 then advances the process to S49.

At S49, the terminal apparatus 200 determines whether the acquisition of video data has ended. If the terminal apparatus 200 determines that the acquisition of video data has ended (Yes at S49), the process is terminated. Meanwhile, if the terminal apparatus 200 does not determine that the acquisition of video data has ended (No at S49), the process is returned to S41, and the terminal apparatus 200 repeats the process of adding to the movement sequence.

Although a method of detecting a posture has been described in the foregoing example, a change in the posture of a passenger observed over a plurality of frames may be detected as a movement of the passenger. Meanwhile, the posture of a passenger may be identified only when a predetermined posture is detected over a plurality of frames. For example, when a standing passenger momentarily loses his or her balance and falls but soon returns to the standing posture, such a posture may be kept from being identified.

When a state in which a passenger has collapsed on the floor is to be detected, since the passenger to be detected is situated at a low position or near the floor, it may be difficult to detect such a passenger. Instead, detecting a passenger in the process of collapsing captured over a plurality of frames makes it possible to more accurately determine that the passenger has collapsed. Since there is a possibility of false detection when detection is made from a single frame, whether the same posture is detected over a plurality of frames may be determined, whereby the possibility of false detection can be reduced. For example, when only a few frames are detected that capture the posture showing that a passenger is falling, this can be regarded as false detection.

In another example embodiment, a passenger at a specific position (e.g., seating place) may be kept from having his or her posture being identified. A reason for this is that it is conceivable that, for example, a passenger sitting on a seat rarely experiences an anomalous state and his or her safety is ensured. In another example, in an area that is off-limits to passengers, only the process of detecting a passenger may be performed, and the process of identifying the posture may be kept from being performed.

In this manner, according to the second example embodiment, the terminal apparatus 200 compares a movement sequence indicating a flow of postures or movements of a passenger P on a bus 3 against a normal posture or a normal movement sequence NS and thus determines whether the posture or the movement of the passenger P is normal. Thus, as a plurality of normal postures or normal movement sequences NS of a passenger on a bus according to positions on the bus are registered beforehand, an anomalous state of a passenger matching actual conditions can be detected. As a result, a means of transportation can be operated while ensuring passenger safety.

Third Example Embodiment

Figure 11:
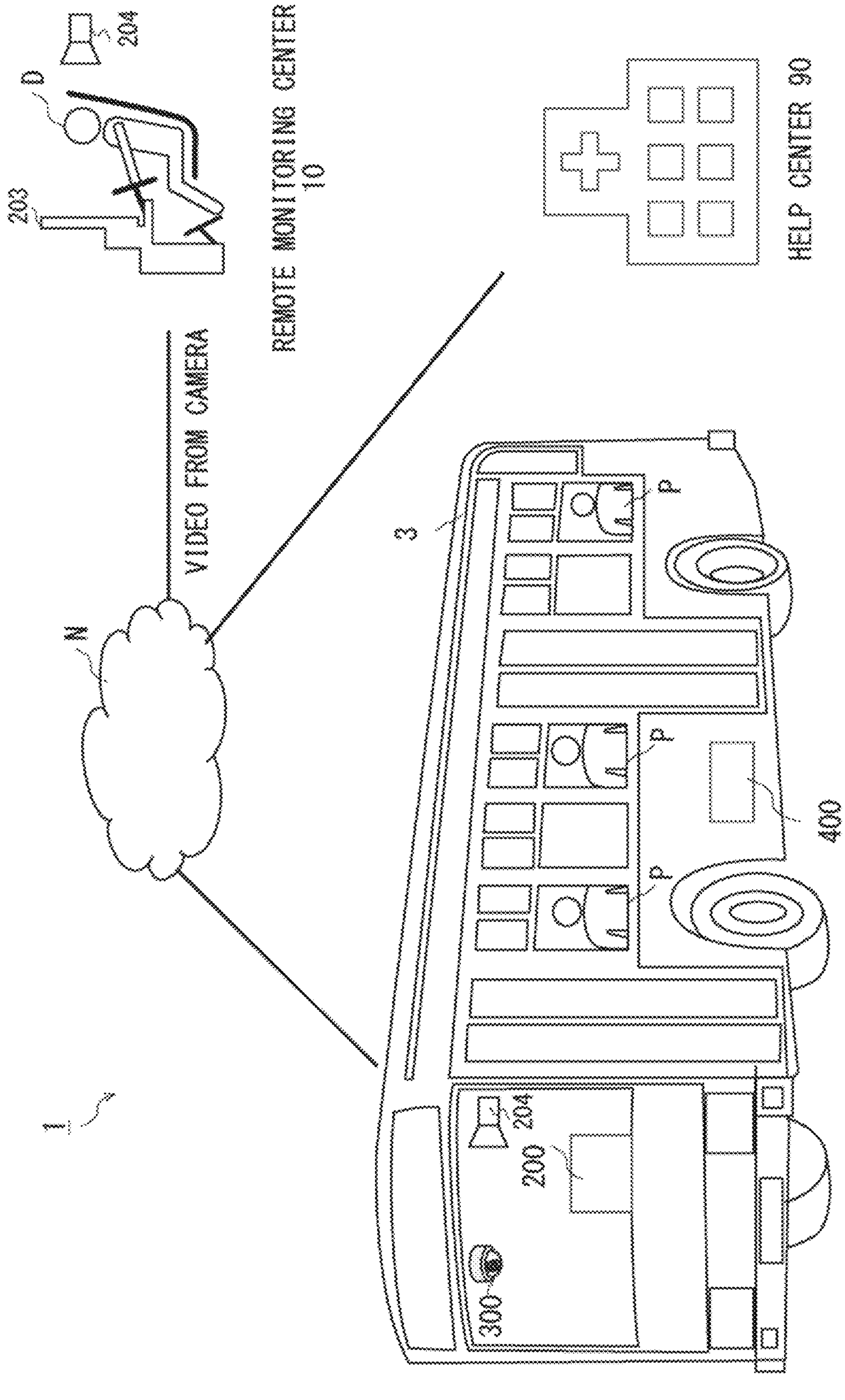
FIG. 11 shows an overall configuration of a remotely monitored driving controlling system according to a third example embodiment.

Next, a third example embodiment of the present disclosure will be described. FIG. 11 shows an overall configuration of a remotely monitored driving controlling system 1 according to a third example embodiment. In the third example embodiment, driving of a bus 3 is controlled by an external remotely monitored driving controlling system. The remotely monitored driving controlling system remotely operates the bus 3 that does not require a driver from a remote monitoring center 10. Videos captured by a plurality of onboard cameras (not shown) installed on the outside of the bus 3 are transmitted to a remove driving controlling apparatus 100 (FIG. 12) of the remote monitoring center 10 via a wireless communication network and the internet. A remote driver D remotely operates the bus 3 while looking at the received videos on a display unit 203. A drive controlling apparatus 400 on the bus 3 engages in bidirectional communication with the remotely monitored driving controlling apparatus 100 through a communication scheme (e.g., LTE, 5G, etc.) that uses a mobile phone network. The remove driving controlling apparatus 100 may include an audio output unit (e.g., speaker) 204.

Furthermore, in the present example embodiment, as described above, the remotely monitored driving controlling system also monitors passengers on the bus, and if such monitoring finds an anomalous state of a passenger as a result, the remotely monitored driving controlling system can transmit warning information to, for example, a help supporting apparatus 900 (described later) disposed in a help center 90 or to the remotely monitored driving controlling apparatus 100. In the present example embodiment, the bus 3 is remotely driven, and the bus does not contain anyone other than the passengers, that is, does not contain the driver, an attendant, or the like. Therefore, as compared to the foregoing example embodiments, even safer traveling and even more appropriate passenger monitoring are needed. Although an unmanned vehicle is remotely driven in the examples described according to the present example embodiment, the present example embodiment can also be applied to self-driving of an unmanned vehicle.

Figure 12:
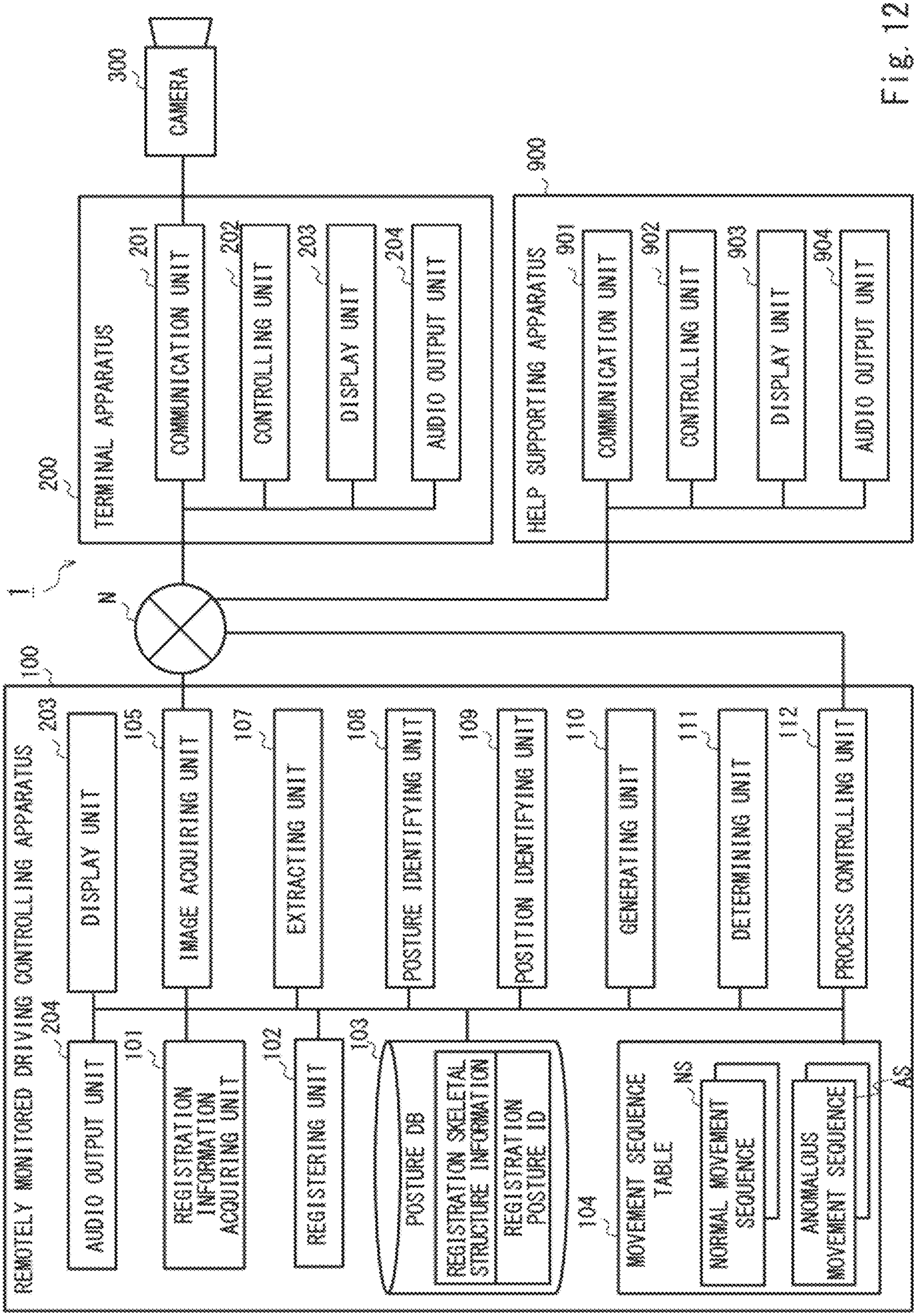
FIG. 12 is a block diagram showing a configuration of a remotely monitored driving controlling apparatus, a terminal apparatus, and a help supporting apparatus according to the third example embodiment.

FIG. 12 is a block diagram showing a configuration of a remotely monitored driving controlling apparatus 100, a terminal apparatus 200, and a help supporting apparatus 900 according to the third example embodiment.

As shown in FIG. 12, the terminal apparatus 200 may include a communication unit 201, a controlling unit 202, a display unit 203, and an audio output unit 204. The terminal apparatus 200 is realized by a computer. The display unit 203 and the audio output unit 204 of the terminal apparatus 200 may be used to inform a passenger or passengers other than a passenger in an anomalous state of a warning. In some example embodiments, the display unit 203 and the audio output unit 204 that are provided to inform the driver on the bus of a warning in the foregoing example embodiments may be provided to inform the remove driver D of a warning, as shown in FIG. 11.

The communication unit 201 is also referred to as a communication means. The communication unit 201 is a communication interface with a network N. The communication unit 201 is connected to a camera 300 and acquires video data from the camera 300 at predetermined intervals.

The controlling unit 202 is also referred to as a controlling means. The controlling unit 202 controls hardware of the terminal apparatus 200. For example, the controlling unit 202, in response to detecting a start trigger, starts transmitting video data acquired from the camera 300 to the remotely monitored driving controlling apparatus 100. Detection of a start trigger indicates, for example, that "a bus has started traveling" as mentioned above. Meanwhile, for example, the controlling unit 202, in response to detecting an end trigger, stops transmitting video data acquired from the camera 300 to the remotely monitored driving controlling apparatus 100. Detection of an end trigger indicates, for example, that "a bus has stopped" or "the passengers are determined to have gotten off a bus 3" as mentioned above. In another example embodiment, the process of detecting a posture and a movement may be executed continuously from the starting time to the ending time of the service of a bus. In other words, even while a bus is stationary at a bus stop, the posture or the movement of a passenger may be detected and determined.

In some example embodiments, the display unit 203 is a display apparatus. The audio output unit 204 is an audio output apparatus including a speaker.

The remotely monitored driving controlling apparatus 100 is one example of the passenger monitoring apparatus 20 described above and is realized by a server computer connected to the network N. The remotely monitored driving controlling apparatus 100 controls the traveling of a bus through a known remotely monitored driving controlling technique, but the details thereof will be omitted herein. The remotely monitored driving controlling apparatus 100 according to the present example embodiment executes also the process of monitoring passengers performed by the terminal apparatus 200 in the foregoing example embodiment. Specifically, the remotely monitored driving controlling apparatus 100 further includes a registration information acquiring unit 101, a registering unit 102, a posture DB 103, a movement sequence table 104, an image acquiring unit 105, an extracting unit 107, a posture identifying unit 108, a position identifying unit 109, a generating unit 110, a determining unit 111, and a process controlling unit 112 (e.g., an output unit described later and a drive controlling unit). In some example embodiments, the remotely monitored driving controlling apparatus 100 may include a display unit 203 and an audio output unit 204. In another example embodiment, part or the whole of the functions of the constituent elements 101 to 112 may be included in the help supporting apparatus 900.

The registration information acquiring unit 101 is also referred to as a registration information acquiring means. The registration information acquiring unit 101 acquires a plurality of pieces of video data for registration in response to a posture or movement registration request from the terminal apparatus 200. In the present third example embodiment, each of the pieces of video data for registration is video data showing an individual posture included in a normal state or an anomalous state of a passenger defined in accordance with a position within a bus. For example, for a place to stand within a bus, each of the pieces of video data for registration is video data showing an individual posture included in a normal state (e.g., a passenger is standing while holding a hanging strap) or an anomalous state (e.g., a passenger is crouching down) of a passenger. Meanwhile, for a place to sit within a bus, each of the pieces of video data for registration is video data showing an individual posture included in a normal state (e.g., a passenger is sitting on a seat) or an anomalous state (e.g., a passenger is sticking his or her face out a window or standing on a seat) of a passenger. In the present second example embodiment, video data for registration is typically a still image (one frame image), but may instead be a moving image that includes a plurality of frame images. The registration information acquiring unit 101 supplies these pieces of acquired information to the registering unit 102.

The registering unit 102 is also referred to as a registering means. First, the registering unit 102 executes a posture registering process in response to a registration request. Specifically, the registering unit 102 supplies video data for registration to the extracting unit 107 described later and acquires skeletal structure information extracted from the video data for registration from the extracting unit 107 as registration skeletal structure information. Then, the registering unit 102 registers the acquired registration skeletal structure information into the posture DB 103 with the registration skeletal structure information linked to a position within the bus and a registration posture ID.

Next, the registering unit 102 executes a sequence registering process in response to a sequence registration request. Specifically, the registering unit 102 arranges registration posture IDs in chronological order based on information indicating the chronological order and thus generates a registration movement sequence. At this point, if the sequence registration request concerns a normal posture or a normal movement, the registering unit 102 registers the generated registration movement sequence into the movement sequence table 104 as a normal posture or a normal movement sequence NS. Meanwhile, if the sequence registration request concerns an anomalous posture or an anomalous movement, the registering unit 102 registers the generated registration movement sequence into the movement sequence table 104 as an anomalous movement sequence AS.

The posture DB 103 is a storage apparatus that stores registration skeletal structure information corresponding to each of a posture or a movement included in a normal state of a passenger with the registration skeletal structure information linked to position information within a bus and a registration posture ID. Furthermore, the posture DB 103 may store position information within a bus and registration skeletal structure information corresponding to each of a posture or a movement included in an anomalous state with these pieces of information linked to a registration posture ID. Rough position information within a bus may include, for example, an area with a seat, an area with no seat, and an area that passengers do not enter (e.g., luggage compartment).

The movement sequence table 104 stores a normal movement sequence NS and an anomalous movement sequence AS. According to the present third example embodiment, the movement sequence table 104 stores a plurality of normal movement sequences NS and a plurality of anomalous movement sequences AS.

The image acquiring unit 105 is also referred to as an image acquiring means. The image acquiring unit 105 acquires video data captured by the camera 300 via the network N. In other words, the image acquiring unit 105 acquires video data in response to a start trigger being detected. The image acquiring unit 105 supplies a frame image included in the acquired video data to the extracting unit 107.

The extracting unit 107 is also referred to as an extracting means. The extracting unit 107 detects an image region of a body (body region) of a person from a frame image included in video data and extracts (e.g., cuts out) the detected image region as a body image. Then, with the use of a skeletal structure estimating technique using machine learning, the extracting unit 107 extracts skeletal structure information of at least a part of the body of the person based on features of, for example, joints of the person recognized in the body image. Skeletal structure information is information composed of a "key point," which is a characteristic point such as a joint, and a "bone (bone link)" indicating a link between key points. The extracting unit 107 may use, for example, a skeletal structure estimating technique, such as OpenPose. The extracting unit 107 supplies the extracted skeletal structure information to the posture identifying unit 108.

The posture identifying unit 108 is one example of the posture identifying unit 18 described above. The posture identifying unit 108 converts skeletal structure information extracted from video data acquired during operation to a posture ID with the use of the posture DB 103. Thus, the posture identifying unit 108 identifies the posture. Specifically, first, the posture identifying unit 108 identifies, from the registration skeletal structure information registered in the posture DB 103, registration skeletal structure information having a degree of similarity with the skeletal structure information extracted by the extracting unit 107 higher than or equal to a predetermined threshold. Then, the posture identifying unit 108 identifies the registration posture ID linked to the identified registration skeletal structure information as the posture ID corresponding to the person included in the acquired frame image.

The position identifying unit 109 is also referred to as a position identifying means. The position identifying unit 109 identifies the position of a passenger within a bus from acquired image data. For example, since the angle of view of a camera is fixed, the position of a passenger within a bus can be identified from the position of that passenger in a captured image. Specifically, since the angle of view of a camera is fixed within a bus, a correspondence relationship between the position of a passenger in a captured image and the position of that passenger within the bus can be defined beforehand. Based on such a definition, a position within an image can be converted to a position within a means of transportation. To be more specific, at a first step, the height at which a camera capturing an image, the azimuth and elevation angles of the camera, and the focal length of the camera (referred to below as camera parameters) are estimated from a captured image with the use of an existing technique. These parameters may instead be actually measured or obtained from specifications. At a second step, with the use of an existing technique, the two-dimensional coordinates of the position where the feet of a person are located within an image (referred to below as image coordinates) are converted to the real-world three-dimensional coordinates (referred to below as world coordinates) based on the camera parameters. Herein, although image coordinates are not normally converted uniquely to world coordinates, image coordinates can be converted to world coordinates uniquely when the coordinate value of where the feet are located in the height direction is fixed to, for example, zero. At a third step, with a three-dimensional map of the inside of the bus prepared beforehand, the world coordinates obtained at the second step are projected onto that map, and thus the position of the passenger within the bus can be identified. The position of a passenger within a bus can be, for example, in an area with a seat, in an area with no seat, or in an area that passengers do not enter (e.g., luggage compartment). In another example embodiment, the position of a passenger within a bus may be in a seating place with a specified seat number or in a place for standing near a seating place with a specified seat number.

The generating unit 110 is also referred to as a generating means. The generating unit 110 generates a movement sequence based on a plurality of posture IDs identified by the posture identifying unit 108. The movement sequence is composed so as to include a plurality of movement IDs in chronological order. The generating unit 110 supplies the generated movement sequence to the determining unit 111.

The determining unit 111 is one example of the determining unit 11 described above. The determining unit 111 determines whether a generated movement sequence matches (corresponds to) any of the normal postures or the normal movement sequences NS registered in the movement sequence table 104.

The process controlling unit 112 outputs warning information to the help supporting apparatus 900 if a generated movement sequence is determined not to match any of the normal movement sequences NS. Specifically, one implementation of the process controlling unit 112 may be an output unit configured to output a warning to, for example, a staff member of the help supporting apparatus 900 via a constituent element (e.g., display unit 903, audio output unit 904) of the help supporting apparatus 900. The display unit 903 and the audio output unit 904 may also be referred to collectively as an informing unit for informing a user.

In another example embodiment, the process controlling unit 112 can execute various processes by remotely controlling, via a network, the drive controlling unit 400 that controls self-driving or drive assistance of a bus. For example, if it is determined that many of a plurality of passengers standing in an area with no seat have all fallen onto the floor, the process controlling unit 112 can perform control of causing the drive controlling unit 400 to decelerate or stop the bus. In another example, when there is a passenger standing without holding a hanging strap or a grab bar in an area with no seat when the bus is to start moving, and if that state continues even after the audio output unit 204 or the driver has cautioned that passenger to hold on to a hanging strap or a grab bar, the drive controlling unit 400 may perform control of not starting the bus. The above are merely examples of some processes that can be performed by the process controlling unit, and various modifications and corrections can be made.

In another example embodiment, an output unit, which is one implementation of the process controlling unit 112, can output different warnings from different informing units in response to different results of determining the posture of a passenger. For example, when a determination of an anomalous posture state is made in which a passenger in a seating place is leaning out of a window near the seat, a warning audio stating "Please do not lean out of the window because it is dangerous" can be output from the audio output unit 204 in the bus 3. Meanwhile, when a passenger at a position with no seat is feeling sick and crouching down, the terminal apparatus 200 can send out, via a network, warning information stating "help request from bus" via an informing unit (i.e., the display unit 903 and the audio output unit 904) of the help supporting apparatus 900 of the help center 90.

If the determining unit 111 has determined that the movement sequence above fails to match any of the normal postures or the normal movement sequences NS, the determining unit 111 may determine whether the movement sequence above matches an anomalous posture or an anomalous movement sequence AS. In this case, the process controlling unit 112 may output information set beforehand in accordance with the type of the anomalous movement sequence to the terminal apparatus 200 or the remotely monitored driving controlling apparatus 100. As one example, the display mode (the letter font, color, or thickness, blinking, etc.) adopted to display warning information may be varied in accordance with the type of an anomalous movement sequence, or the volume or the voice itself adopted to audibly output warning information may be varied in accordance with the type of an anomalous movement sequence. Furthermore, the content of the warning to be output may be varied in accordance with the type of an anomalous movement sequence. Thus, the driver, an attendant, or other passengers, for example, can recognize the content of an anomalous state of a passenger, and promptly and appropriately respond to the anomalous state. Furthermore, the process controlling unit 112 may record, as history information, the time and place at which an anomalous state of a passenger has occurred and the video captured when that anomalous state has occurred along with the information about the type of the anomalous posture or the anomalous movement sequence. Thus, the driver, an attendant, other passengers, or an external help staff member, for example, can recognize the content of the anomalous state and take an appropriate measure against the anomalous state.

In some example embodiments, on the display unit 203 of the remotely monitored driving controlling apparatus 100, a video showing the outside of the vehicle (e.g., oncoming vehicles, roads, guardrails, etc.) for self-driving or drive assistance as well as a video showing the inside of the vehicle for monitoring passengers may be displayed. When a passenger is determined to be in an anomalous state, a warning may be displayed on the display unit 203 for the remote driver or the like. Moreover, a warning sound may be output via the audio output unit 204.

Figure 13:
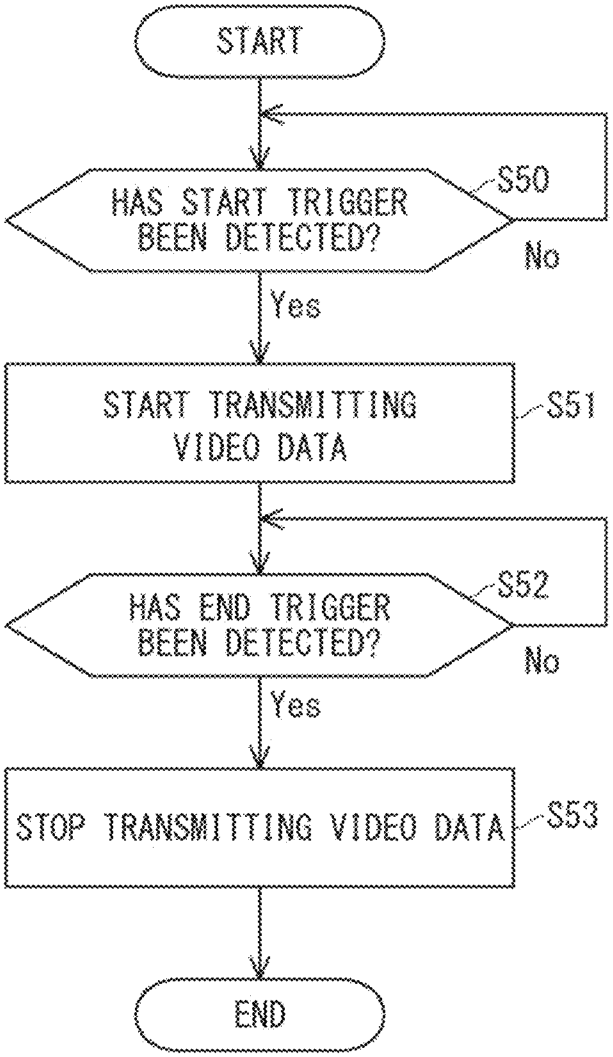
FIG. 13 is a flowchart showing a method of acquiring video data by a remotely monitored driving controlling apparatus according to the third example embodiment.

FIG. 13 is a flowchart showing a flow of a method of transmitting video data by a terminal apparatus 200 according to the third example embodiment. First, the controlling unit 202 of the terminal apparatus 200 determines whether the controlling unit 202 has detected a start trigger (S50). If the controlling unit 202 determines that the controlling unit 202 has detected a start trigger (Yes at S50), the controlling unit 202 starts transmitting video data acquired from the camera 300 to the remotely monitored driving controlling apparatus 100 (S51). Meanwhile, if the controlling unit 202 does not determine that the controlling unit 202 has detected a start trigger (No at S50), the controlling unit 202 repeats the process indicated at S50.

Next, the controlling unit 202 of the terminal apparatus 200 determines whether the controlling unit 202 has detected an end trigger (S52). If the controlling unit 202 determines that the controlling unit 202 has detected an end trigger (Yes at S52), the controlling unit 202 stops transmitting video data acquired from the camera 300 to the server 100 (S53). Meanwhile, if the controlling unit 202 does not determine that the controlling unit 202 has detected an end trigger (No at S52), the controlling unit 202 repeats the process indicated at S52 while continuing to transmit video data.

In this manner, as the period in which video data is transmitted is limited to the period from a predetermined start trigger to a predetermined end trigger, the amount of communication data can be limited to the minimum. Furthermore, the process of detecting a movement by the remotely monitored driving controlling apparatus 100 can be omitted outside the period mentioned above, and thus the calculation resources can be saved.

Figure 14:
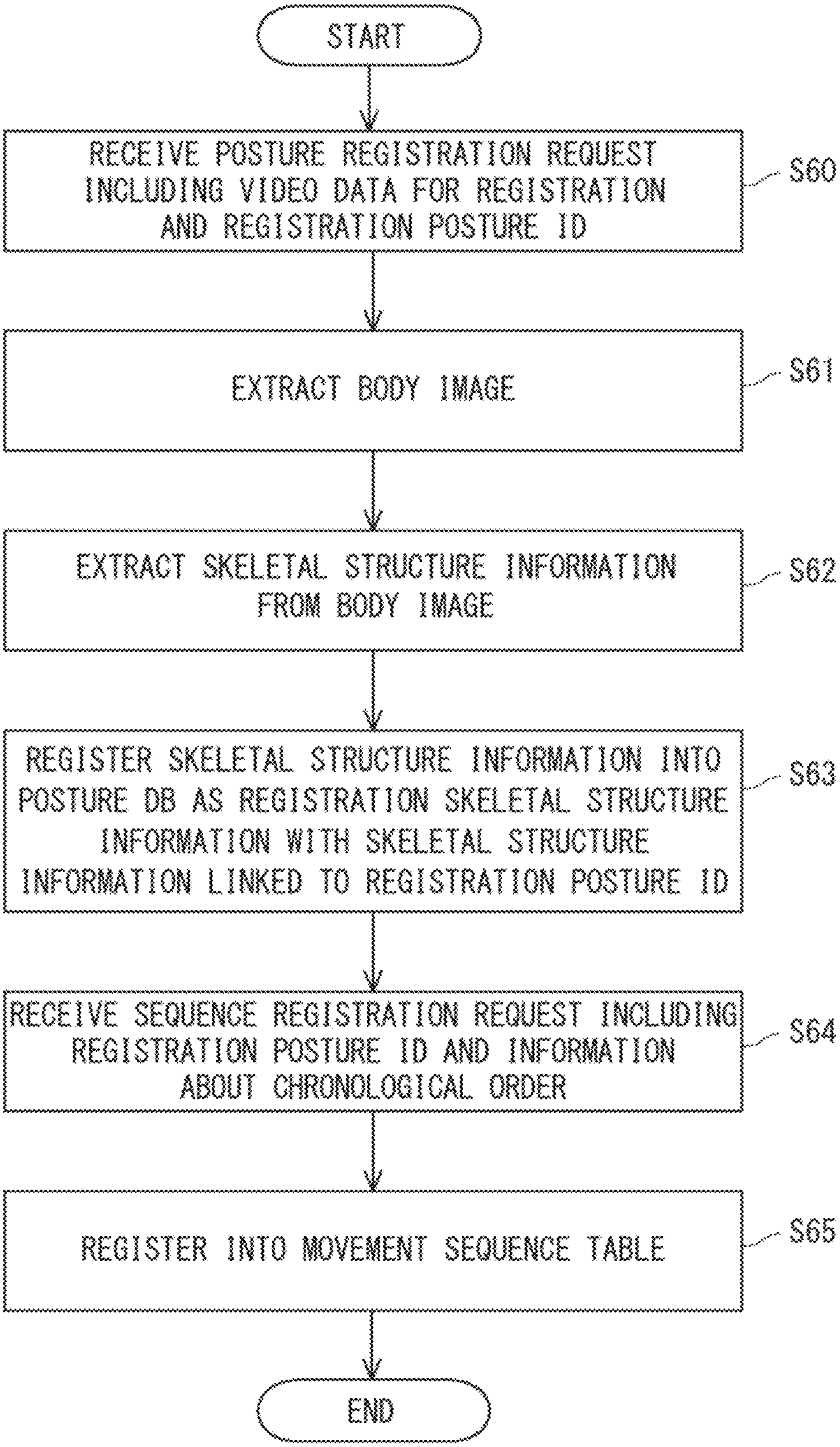
FIG. 14 is a flowchart showing a flow of a method of registering a registration posture ID and a registration movement sequence by a server according to the third example embodiment.

FIG. 14 is a flowchart showing a flow of a method of registering a registration posture ID and a registration movement sequence by a remotely monitored driving controlling apparatus 100 according to the third example embodiment. First, the registration information acquiring unit 101 of the remotely monitored driving controlling apparatus 100 receives, from the terminal apparatus 200, a posture registration request including video data for registration and a registration posture ID. Next, the registering unit 102 supplies the video data for registration to the extracting unit 107. Having acquired the video data for registration, the extracting unit 107 extracts a body image from a frame image included in the video data for registration (S61). Next, the extracting unit 107 extracts skeletal structure information from the body image (S62). Next, the registering unit 102 acquires the skeletal structure information from the extracting unit 107 and registers the acquired skeletal structure information into the posture DB 103 as registration skeletal structure information with the skeletal structure information linked to the registration posture ID (S63). Herein, the registering unit 102 may register the entire skeletal structure information extracted from the body image as the registration skeletal structure information or may register only part of the skeletal structure information (e.g., skeletal structure information about shoulders, elbows, and hands) as the registration skeletal structure information.

Figure 15:
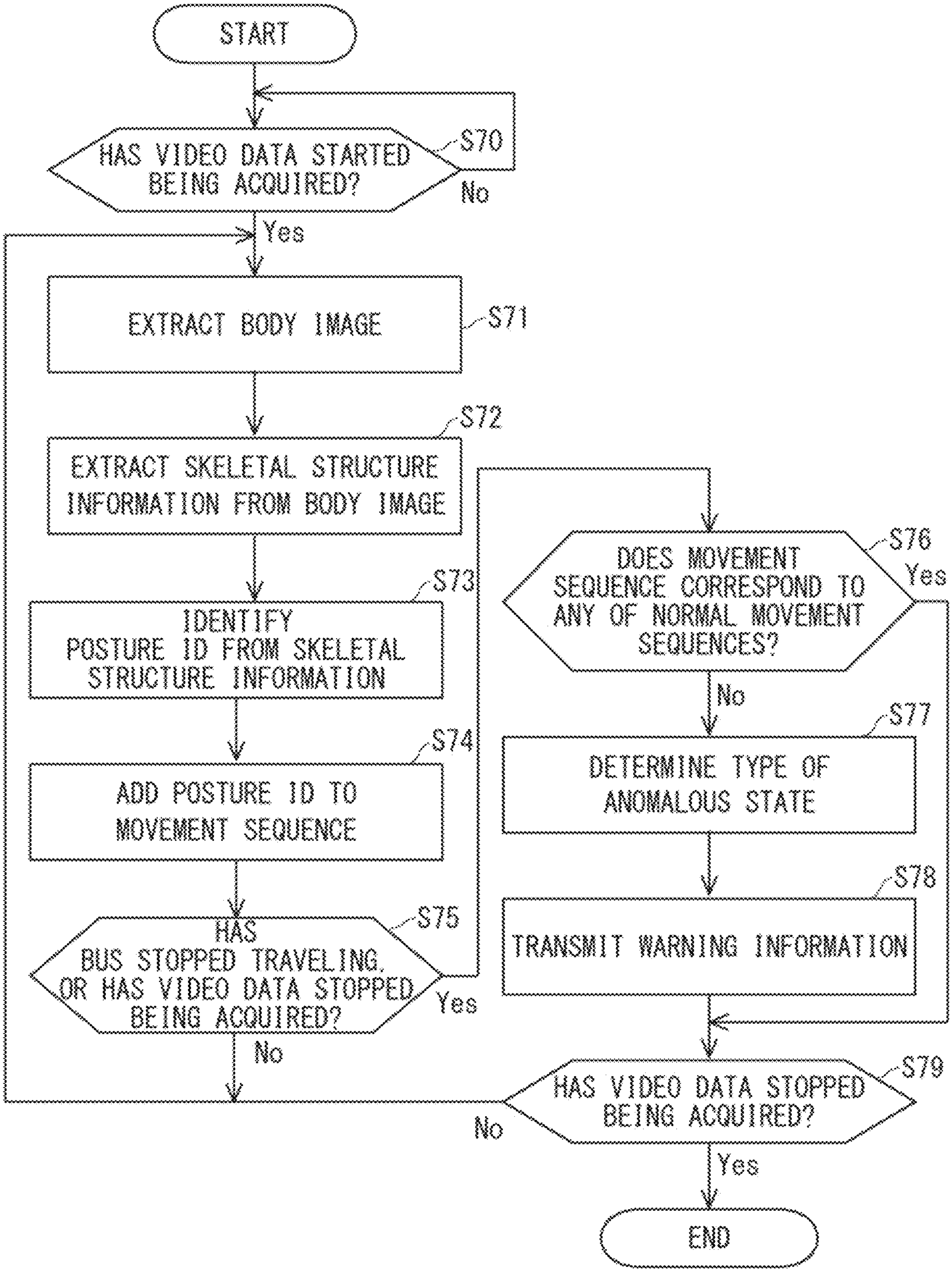
FIG. 15 is a flowchart showing a flow of a method of detecting a posture and a movement by a server according to the third example embodiment.

FIG. 15 is a flowchart showing a flow of a method of detecting a posture and a movement by a remotely monitored driving controlling apparatus 100 according to the third example embodiment. First, if the image acquiring unit 105 of the remotely monitored driving controlling apparatus 100 has started acquiring video data from the terminal apparatus 200 (Yes at S70), the extracting unit 107 extracts a body image from a frame image included in the video data (S71). Next, the extracting unit 107 extracts skeletal structure information from the body image (S72). The posture identifying unit 108 calculates the degree of similarity between at least part of the extracted skeletal structure information and each piece of registration skeletal structure information registered in the posture DB 103 and identifies, as a registration posture ID, the registration posture ID linked to the piece of the registration skeletal structure information having a degree of similarity higher than or equal to a predetermined threshold (S73). Next, the generating unit 110 adds the posture ID to a movement sequence. Specifically, the generating unit 110 sets the posture ID identified at S73 as a movement sequence in the initial cycle, or adds the posture ID identified at S73 to an already generated movement sequence in cycles subsequent to the initial cycle. Then, the remotely monitored driving controlling apparatus 100 determines whether the bus has stopped traveling or determines whether the acquisition of video data has ended (S75). If the remotely monitored driving controlling apparatus 100 determines that the bus has stopped traveling or determines that the acquisition of video data has ended (Yes at S75), the process proceeds to S76. Meanwhile, if neither determination is true (No at S75), the process returns to S71, and the remotely monitored driving controlling apparatus 100 repeats the process of adding to the movement sequence.

At S76, the determining unit 111 determines whether the movement sequence matches any of the normal movement sequences NS in the movement sequence table 104. If the movement sequence corresponds to a normal movement sequence NS (Yes at S76), the process proceeds to S79. Meanwhile, if the movement sequence does not match any of the normal movement sequences NS (No at S76), the process proceeds to S77.

At S77, the determining unit 111 determines which of the anomalous movement sequences AS in the movement sequence table 104 the movement sequence matches and thus determines the type of the anomalous movement. Then, the process controlling unit 112 transmits warning information corresponding to the type of the anomalous posture or the anomalous movement to the terminal apparatus 200 (S78). The remotely monitored driving controlling apparatus 100 then advances the process to S79.

At S79, the remotely monitored driving controlling apparatus 100 determines whether the acquisition of video data has ended. If the remotely monitored driving controlling apparatus 100 determines that the acquisition of video data has ended (Yes at S79), the process is terminated. Meanwhile, if the remotely monitored driving controlling apparatus 100 does not determine that the acquisition of video data has ended (No at S79), the process is returned to S71, and the remotely monitored driving controlling apparatus 100 repeats the process of adding to the movement sequence. By returning the process to S71, any movement observed between the time when the bus 3 stops traveling to the time when the passenger P gets off the bus 3 can be monitored.

In this manner, according to the third example embodiment, the remotely monitored driving controlling apparatus 100 compares a movement sequence indicating a flow of movements of a passenger on a bus 3 against a normal movement sequence NS and thus determines whether the posture or the movement of the passenger is normal. Thus, as a plurality of normal movement sequences NS matching the postures of a passenger corresponding to positions within a bus are registered beforehand, an anomalous movement matching actual conditions can be detected.

It is to be noted that the present disclosure is not limited to the foregoing example embodiments, and modifications can be made, as appropriate, within the scope that does not depart from the technical spirit. Examples of remote driving have been described in the foregoing example embodiments, but the example embodiments can be applied to cases of self-driving vehicles of any modes.

The foregoing example embodiments have been described as configurations of hardware, but these are not limiting examples. The present disclosure can also be implemented through desired processes by causing a processor to execute a computer program.

In the examples described above, a program includes a set of instructions (or software codes) that, when loaded onto a computer, causes the computer to execute one or more functions described according the example embodiments. The program may be stored in a non-transitory computer-readable medium or a tangible storage medium. As some non-limiting examples, a computer-readable medium or a tangible storage medium includes a random-access memory (RAM), a read-only memory (ROM), a flash memory, a solid-state drive (SSD), or other memory technologies: a CD-ROM, a digital versatile disc (DVD), a Blu-ray (registered trademark) disc, or other optical disc storages; and a magnetic cassette, a magnetic tape, a magnetic disk storage, or other magnetic storage devices. The program may be transmitted via a transitory computer-readable medium or a communication medium. As some non-limiting examples, a transitory computer-readable medium or a communication medium includes an electrical, optical, or acoustic propagation signal or a propagation signal of any other forms.

Part or the whole of the foregoing example embodiments can also be described as in the following supplementary notes, which are not limiting.

(Supplementary Note 1)

A passenger monitoring apparatus comprising:

an image acquiring unit configured to acquire image data capturing an image of a passenger on a means of transportation;

a posture identifying unit configured to identify a posture of the passenger based on the acquired image data;

a position identifying unit configured to identify a position of the passenger within the means of transportation; and a determining unit configured to determine whether the identified posture of the passenger matches a predetermined posture pattern corresponding to the identified position of the passenger.

(Supplementary Note 2)

The passenger monitoring apparatus according to supplementary note 1, further comprising an output unit configured to output a warning in accordance with a result of the determination of the posture of the passenger.

(Supplementary Note 3)

The passenger monitoring apparatus according to supplementary note 2, wherein the output unit is configured to output different warnings from different informing units in accordance with different results of the determination of the posture of the passenger.

(Supplementary Note 4)

The passenger monitoring apparatus according to supplementary note 3, wherein the different informing units include a first informing unit provided inside the means of transportation and a second informing unit provided outside the means of transportation.

(Supplementary Note 5)

The passenger monitoring apparatus according to any one of supplementary notes 1 to 4, wherein the position to be identified of the passenger includes an area with no seat within the means of transportation and an area with a seat.

(Supplementary Note 6)

The passenger monitoring apparatus according to any one of supplementary notes 1 to 5, wherein a first predetermined posture pattern in the area with no seat within the means of transportation and a second predetermined posture pattern in the area with a seat differ from each other.

(Supplementary Note 7)

The passenger monitoring apparatus according to any one of supplementary notes 1 to 6, wherein the posture identifying unit is configured to identify the posture by setting an articulation point and a simulated skeletal structure of the passenger based on the acquired image data.

(Supplementary Note 8)

The passenger monitoring apparatus according to any one of supplementary notes 1 to 7, further comprising a controlling unit configured to control traveling of the means of transportation based on a result of determination of the posture of the passenger.

(Supplementary Note 9)

A passenger monitoring method comprising:

acquiring image data capturing an image of a passenger on a means of transportation;

identifying a posture of the passenger based on the acquired image data;

identifying a position of the passenger within the means of transportation; and determining whether the identified posture of the passenger matches a predetermined posture pattern corresponding to the identified position of the passenger.

(Supplementary Note 10)

The passenger monitoring method according to supplementary note 9, wherein a warning is output in accordance with a result of the determination of the posture of the passenger.

(Supplementary Note 11)

The passenger monitoring method according to supplementary note 10, wherein different warnings are output from different informing units in accordance with different results of the determination of the posture of the passenger.

(Supplementary Note 12)

The passenger monitoring method according to supplementary note 11, wherein the different informing units include a first informing unit provided inside the means of transportation and a second informing unit provided outside the means of transportation.

(Supplementary Note 13)

The passenger monitoring method according to any one of supplementary notes 9 to 12, wherein the position to be identified of the passenger includes an area with no seat within the means of transportation and an area with a seat.

(Supplementary Note 14)

The passenger monitoring method according to any one of supplementary notes 9 to 13, wherein a first predetermined posture pattern in the area with no seat within the means of transportation and a second predetermined posture pattern in the area with a seat differ from each other.

(Supplementary Note 15)

A non-transitory computer-readable medium storing a program that causes a computer to execute an operation comprising:

a process of acquiring image data capturing an image of a passenger on a means of transportation;

a process of identifying a posture of the passenger based on the acquired image data;

a process of identifying a position of the passenger within the means of transportation; and a process of determining whether the identified posture of the passenger matches a predetermined posture pattern corresponding to the identified position of the passenger.

(Supplementary Note 16)

The non-transitory computer-readable medium according to supplementary note 15, wherein the operation includes a process of outputting a warning in accordance with a result of the determination of the posture of the passenger.

(Supplementary Note 17)

The non-transitory computer-readable medium according to supplementary note 16, wherein the operation includes a process of outputting different warnings from different informing units in accordance with different results of the determination of the posture of the passenger.

(Supplementary Note 18)

The non-transitory computer-readable medium according to supplementary note 17, wherein the different informing units include a first informing unit provided inside the means of transportation and a second informing unit provided outside the means of transportation.

(Supplementary Note 19)

The non-transitory computer-readable medium according to any one of supplementary notes 15 to 18, wherein the position to be identified of the passenger includes an area with no seat within the means of transportation and an area with a seat.

(Supplementary Note 20)

The non-transitory computer-readable medium according to any one of supplementary notes 15 to 19, wherein a first predetermined posture pattern in the area with no seat within the means of transportation and a second predetermined posture pattern in the area with a seat differ from each other.

REFERENCE SIGNS LIST

1 PASSENGER MONITORING SYSTEM
10 REMOTE MONITORING CENTER
11 DETERMINING UNIT
15 IMAGE ACQUIRING UNIT
18 POSTURE IDENTIFYING UNIT
19 POSITION IDENTIFYING UNIT
20 PASSENGER MONITORING APPARATUS
40, 50 FRAME IMAGE
90 HELP CENTER
100 REMOTELY MONITORED DRIVING CONTROLLING APPARATUS
101 REGISTRATION INFORMATION ACQUIRING UNIT
102 REGISTERING UNIT
103 POSTURE DB
104 MOVEMENT SEQUENCE TABLE
105 IMAGE ACQUIRING UNIT
107 EXTRACTING UNIT
108 POSTURE IDENTIFYING UNIT
109 POSITION IDENTIFYING UNIT
110 GENERATING UNIT
111 DETERMINING UNIT
112 PROCESS CONTROLLING UNIT
200 TERMINAL APPARATUS
201 COMMUNICATION UNIT
202 CONTROLLING UNIT
203 DISPLAY UNIT
204 AUDIO OUTPUT UNIT
300 CAMERA
400 DRIVE CONTROLLING UNIT
900 HELP SUPPORTING APPARATUS
901 COMMUNICATION UNIT
902 CONTROLLING UNIT
903 DISPLAY UNIT
904 AUDIO OUTPUT UNIT
P PASSENGER
N NETWORK

What is claimed is:

1. A passenger monitoring apparatus comprising:

at least one memory storing instructions, and at least one processor configured to execute the instructions to;

acquire image data capturing an image of a passenger on a means of transportation the image data containing a first area and a second area;

identify a posture of the passenger based on the acquired image data;

identify a position of the passenger within the means of transportation; and based on the identified position of the passenger being within the first area, determine whether the identified posture of the passenger matches a first posture pattern, the first posture pattern being set for the first area in advance, and based on the identified position of the passenger being within the second area, determine whether the identified posture of the passenger matches a second posture pattern, the second posture pattern being set for the second area in advance, the second posture pattern being at least partially different from the first posture pattern.

2. The passenger monitoring apparatus according to claim 1, wherein the at least one processor is configured to execute the instructions to output a warning in accordance with a result of the determination of whether the identified posture matches the first posture pattern or the second posture pattern.

3. The passenger monitoring apparatus according to claim 2, wherein the at least one processor is configured to execute the instructions to output different warnings from different informing units in accordance with the result of the determination of the posture of the passenger.

4. The passenger monitoring apparatus according to claim 3, wherein the different informing units include a first informing unit provided inside the means of transportation and a second informing unit provided outside the means of transportation.

5. The passenger monitoring apparatus according to claim 1, wherein the identified position the passenger includes an area with no seat within the means of transportation and an area with a seat.

6. The passenger monitoring apparatus according to claim 1, wherein a first predetermined posture pattern in an area with no seat within the means of transportation and a second predetermined posture pattern in an area with a seat differ from each other.

7. The passenger monitoring apparatus according to claim 1, wherein the at least one processor being configured to execute the instructions to, based on the identified position of the passenger being a predetermined area including at least one of the group consisting of an area with no seat, an area with a priority seat, and an area with a seat other than the priority seat within the means of transportation, determine whether the identified posture of the passenger matches any one from the group consisting of a posture pattern corresponding to the area with no seat, a posture pattern corresponding to the area with a priority seat, and a posture pattern corresponding to the area with a seat other than the priority seat.

8. The passenger monitoring apparatus according to claim 1, wherein the at least one processor is configured to execute the instructions to, identify a plurality of postures of the passenger based on the acquired image data;

generate a movement sequence in a chronological order based on the identified plurality of postures;

store a normal movement sequence including a plurality of normal postures of a passenger in a chronological order and an anomalous movement sequence including a plurality of anomalous postures of a passenger in a chronological order; and determine whether the generated movement sequence matches any of the normal movement sequence and the anomalous movement sequence.

9. A passenger monitoring method comprising:

acquiring image data capturing an image of a passenger on a means of transportation the image data containing a first area and a second area;

identifying a posture of the passenger based on the acquired image data;

identifying a position of the passenger within the means of transportation; and based on the identified position of the passenger being within the first area, determining whether the identified posture of the passenger matches a first posture pattern corresponding to the identified position of the passenger, the first posture pattern being set for the first area in advance, and based on the identified position of the passenger being within the second area, determining whether the identified posture of the passenger matches a second posture pattern, the second posture pattern being set for the second area in advance, the second posture pattern being at least partially different from the first posture pattern.

10. The passenger monitoring method according to claim 9, wherein a warning is output in accordance with a result of the determining whether the identified posture matches the first posture pattern or the second posture pattern.

11. The passenger monitoring method according to claim 10, wherein different warnings are output from different informing units in accordance with the result of the determination of the posture of the passenger.

12. The passenger monitoring method according to claim 11, wherein the different informing units include a first informing unit provided inside the means of transportation and a second informing unit provided outside the means of transportation.

13. The passenger monitoring method according to claim 9, wherein the identified position of the passenger includes an area with no seat within the means of transportation and an area with a seat.

14. The passenger monitoring method according to claim 9, wherein a first predetermined posture pattern in an area with no seat within the means of transportation and a second predetermined posture pattern in an area with a seat differ from each other.

15. A non-transitory computer-readable medium storing a program that causes a computer to execute an operation comprising:

a process of acquiring image data capturing an image of a passenger on a means of transportation the image data containing a first area and a second area;

a process of identifying a posture of the passenger based on the acquired image data;

a process of identifying a position of the passenger within the means of transportation; and a process of, based on the identified position of the passenger being within the first area, determining whether the identified posture of the passenger matches a first posture pattern, the first posture pattern being set for the first area in advance, and a process of, based on the identified position of the passenger being within the second area, determining whether the identified posture of the passenger matches a second posture pattern, the second posture pattern being set for the second area in advance, the second posture pattern being at least partially different from the first posture pattern.

16. The non-transitory computer-readable medium according to claim 15, wherein the operation includes a process of outputting a warning in accordance with a result of the determining whether the identified posture matches the first posture pattern or the second posture pattern.

17. The non-transitory computer-readable medium according to claim 16, wherein the operation includes a process of outputting different warnings from different informing units in accordance with the result of the determination of the posture of the passenger.

18. The non-transitory computer-readable medium according to claim 17, wherein the different informing units include a first informing unit provided inside the means of transportation and a second informing unit provided outside the means of transportation.

19. The non-transitory computer-readable medium according to claim 15, wherein the identified position of the passenger includes an area with no seat within the means of transportation and an area with a seat.

20. The non-transitory computer-readable medium according to claim 15, wherein a first predetermined posture pattern in an area with no seat within the means of transportation and a second predetermined posture pattern in an area with a seat differ from each other.

* * * * *